US012753712B2

(12) United States Patent
Ihns et al.

(10) Patent No.: US 12,753,712 B2
(45) Date of Patent: Oct. 6, 2026

(54) AIR-FLUID SEPARATOR

(71) Applicant: Improved Racing Products, LLC, Orlando, FL (US)

(72) Inventors: Richard Michael Ihns, Orlando, FL (US); Casey A. Fitzgerald, Orlando, FL (US); Jarott E. Nelson, Orlando, FL (US)

(73) Assignee: Improved Racing Products, LLC, Orlando, FL (US)

( * ) Notice: Subject to any disclaimer, the term of this patent is extended or adjusted under 35 U.S.C. 154(b) by 0 days.

(21) Appl. No.: 18/939,957

(22) Filed: Nov. 7, 2024

(65) Prior Publication Data

US 2025/0146432 A1 May 8, 2025

Related U.S. Application Data

(60) Provisional application No. 63/547,755, filed on Nov. 8, 2023.

(51) Int. Cl.
*B01D 46/00* (2022.01)
*F01M 13/04* (2006.01)

(52) U.S. Cl.
CPC ......... *F01M 13/04* (2013.01); *B01D 46/0047* (2013.01); *F01M 2013/0438* (2013.01)

(58) Field of Classification Search
CPC ...... B01D 46/10; B01D 46/103; B01D 46/12; B01D 39/00; F01M 13/04; F01M 2013/0438; F01M 2013/0422; F01M 2013/0433; F01M 13/00; F01M 1/10
USPC ........ 123/41.86, 198 E, 196 A; 55/323, 337, 55/482; 96/216, 217, 220
See application file for complete search history.

(56) References Cited

U.S. PATENT DOCUMENTS

| | | | | | |
|---|---|---|---|---|---|
| 3,200,568 | A * | 8/1965 | McNeil | B07B 7/08 | 96/195 |
| 3,339,350 | A * | 9/1967 | Sims | B01D 46/10 | 55/320 |
| 3,378,993 | A * | 4/1968 | Veres | F16T 1/20 | 251/35 |
| 4,402,493 | A * | 9/1983 | Tsuge | B60G 17/0408 | 280/124.16 |
| 4,925,466 | A * | 5/1990 | Overby | B01D 46/0031 | 55/319 |

(Continued)

FOREIGN PATENT DOCUMENTS

| | | | | |
|---|---|---|---|---|
| CN | 106014539 B | * | 12/2018 | F01M 13/04 |
| CN | 112901311 A | * | 6/2021 | F01M 13/04 |

(Continued)

*Primary Examiner* — George C Jin
*Assistant Examiner* — Teuta B Holbrook
(74) *Attorney, Agent, or Firm* — Brown Rudnick LLP; Matthew P. York

(57) ABSTRACT

The disclosure relates generally to an air-fluid separator device comprising a plurality of uniquely designed separator components cooperatively arranged to define a pathway through which untreated and potentially contaminated air flows and undergoes treatment in which contaminants, which may be in the form of fluid-based contaminants, are removed from the air before the air is reused (e.g., returned to an intake manifold of an engine). The contaminants may include, but are not limited to, water, oil, carbon particles, and unburned fuel, for example.

36 Claims, 24 Drawing Sheets

(56) References Cited

U.S. PATENT DOCUMENTS

| | | | | | |
|---|---|---|---|---|---|
| 5,586,996 | A * | 12/1996 | Manookian, Jr. | B01D 46/2411 123/573 |
| 5,800,584 | A * | 9/1998 | Hinderer | B01D 46/64 55/482 |
| 7,396,473 | B1 * | 7/2008 | Guynn | B01D 35/185 210/DIG. 17 |
| 9,005,324 | B2 * | 4/2015 | Smith | A47L 9/0081 55/337 |
| 2005/0045043 | A1 * | 3/2005 | Bazzarella | B01D 45/14 96/216 |
| 2005/0252179 | A1 * | 11/2005 | Oh | B04C 5/26 55/337 |
| 2009/0242470 | A1 * | 10/2009 | Muenkel | F01M 13/04 210/236 |
| 2018/0264387 | A1 * | 9/2018 | Wagner | B01D 51/00 |

FOREIGN PATENT DOCUMENTS

| | | | | |
|---|---|---|---|---|
| DE | 3634122 | A1 * | 4/1988 | B04C 5/13 |
| DE | 19615290 | A1 * | 1/1998 | B01D 46/0012 |
| DE | 20023969 | U1 * | 3/2008 | F01M 13/04 |
| JP | 6567323 | B2 * | 8/2019 | |

* cited by examiner

AIR-FLUID SEPARATOR

CROSS-REFERENCE TO RELATED APPLICATIONS

This application claims priority to, and the benefit of, U.S. Provisional Application No. 63/547,755, filed Nov. 8, 2023, the content of which is incorporated by reference herein in its entirety.

TECHNICAL FIELD

The disclosure relates generally to the field of crankcase ventilation systems specifically for an engine. More particularly, the disclosure is directed to an air-fluid separator device for treating air flowing therethrough by removing undesirable contaminants therefrom.

BACKGROUND

There have been many advancements to the internal combustion engine over the years. For example, until recently, internal combustion engines in automobiles typically employed an indirect or port fuel injection system. In such systems, aerosolized fuel is injected into the air intake manifold, where it is mixed with the fresh air intake as well as with oil-laden positive crankcase ventilation (PCV) gases vented from the crankcase into the air intake manifold. More importantly, by injecting aerosolized fuel into the air intake manifold, the fuel served to continually "wash" the valve and valve stem, thereby minimizing the build of oil residue from the oil-laden PCV gases.

Faced with increased fuel efficiency requirements, many automobile manufacturers began utilizing direct fuel injection engines to provide improved fuel efficiency over the indirect injection and port injection engines. However, such engines still suffer from drawbacks. For example, a significant and unforeseen drawback to a direct injection engine is the buildup of carbon deposits on and around the valves due to oil, fuel components, and other particulates and/or contaminants in the positive crankcase ventilation (PCV) gasses which are routed directly into the combustion chamber of these engines. This carbon buildup results in reduced engine efficiency, reduced power, and may increase emissions of noxious combustion byproducts.

Carbon buildup occurs even in engines having indirect fuel injectors, albeit to a much lesser degree. This is because the air intake stroke, and thus the time for oil-laden positive ventilation crankcase gases to enter the combustion chamber, is much longer than the fuel injector spray cycle time. Therefore, only a portion of the incoming raw crankcase oils entrained in the positive ventilation crankcase gases are "washed" out of the gases via indirect fuel injection, while the remainder of the raw crankcase oil particles are directed into the combustion chamber where they are only partially combusted.

Various methods of cleaning carbon buildup from valves and valve stems have been proposed, but none are believed to be more than nominally effective, and all are extremely time and labor intensive, and thus, expensive for the owner to undertake. One attempt to resolve the problems created by direct fuel injection has been to provide both indirect and direct fuel injectors. However, such a system results in a decrease in efficiency, relative to an engine having direct fuel injection only, with the further disadvantage of the considerable added expense of building an engine having multiple fuel injectors and the corresponding control systems for the same. Furthermore, this solution does not readily lend itself to the retrofit of an engine originally equipped solely with direct fuel injection.

As such, a common problem with the operation of an internal combustion engine, regardless of whether it employs indirect fuel injection, direct fuel injection, or possibly a combination of the two, is that a certain amount of crankcase oils, or any other contaminants, entrained in the positive crankcase ventilation gases may enter the combustion chamber.

To combat the presence of oil entrained in the PCV gases (also referred to herein as "blow-by gases"), oil and air separators were developed to remove the oil from the blow-by gases before recirculation into the intake manifold. There are various types of oil and air separators available. One common type of oil and air separator involves passing oily blow-by gases through a filter material. The oil collects in droplets on the filter material, which is held in place by a screen. The oil is allowed to drop into the bottom of a can where the oil collects for later removal. This "can approach" to oil and air separation is not without its drawbacks, however. In particular, the screen in the can that helps hold the filter material in place may serve as a pathway along which oil may flow, thereby allowing unwanted oil vapors to flow into and become part of the exhaust from the oil and air separator can.

SUMMARY

The present invention recognizes the drawbacks of current ventilation systems and devices, particularly those systems and devices used for attempting to separate oil or other contaminants from air associated with an engine. To address such drawbacks, the present invention provides an air-fluid separator device comprising a plurality of uniquely designed separator components cooperatively arranged to define a pathway through which untreated and potentially contaminated air flows and undergoes treatment in which contaminants, which may be in the form of fluid-based contaminants, are removed from the air before the air is reused (e.g., returned to an intake manifold of an engine). The contaminants may include, but are not limited to, water, oil, carbon particles, and unburned fuel, for example.

In particular, the air-fluid separator includes a housing comprising separator components cooperatively arranged to define a pathway through which untreated and potentially contaminated air flows and undergoes treatment in which contaminants are removed therefrom. The housing includes an inlet port for receiving untreated and potentially contaminated air and directing the air to flow into a separation chamber.

In some embodiments, the inlet port may have a tangential orientation relative to an inner surface of the housing to thereby cause incoming untreated and potentially contaminated air to rotationally flow within the separation chamber of the housing and induce separation of contaminants from air and subsequent deposition of said separated contaminants along an outer perimeter of the separation chamber. Accordingly, the rotational flow caused by the tangential orientation of the inlet port relative to the inner surface of the housing, which forms a surface of the separation chamber, results in cyclonic separation action to occur within the separation chamber.

The housing further includes a filter assembly positioned adjacent to the separation chamber and configured to receive deposited contaminants from the separation chamber. The filter assembly is further configured to coalesce said deposited contaminants into larger deposits while allowing air to pass therethrough.

The filter assembly may generally be comprised of a plurality of vertically arranged filter layers, each filter layer comprising a different associated porosity. For example, the filter assembly may be composed of multiple layers (i.e., 2 layers, 3 layers, 4 layers, 5 layers, etc.) of different porosities of stainless steel meshes sintered together, wherein a top-most layer of the plurality of filter layers comprises finer porosity and a bottom-most layer of the plurality of filter layers comprises a coarser porosity. Such a configuration allows for coalescing deposited contaminants received from the separation chamber into gradually larger deposits as the deposited contaminants pass through the plurality of filter layers.

The housing further includes a drain funnel positioned adjacent to the filter assembly. The drain funnel includes a plurality of spiral-shaped grooves formed along a collection surface thereof. The drain funnel serves multiple functions. For example, the plurality of grooves are configured to collect contaminant deposits received from the filter assembly and direct the collected contaminant deposits towards a drain hole of the funnel and subsequently into a collection reservoir coupled to the housing. Furthermore, the plurality of grooves of the drain funnel are arranged to cause air flowing through the filter assembly to rotationally flow and thereby induce further separation of any residual fluid content from air and subsequent deposition of said separated residual fluid content along an inner surface of the housing surrounding the drain funnel. Additionally, the drain funnel is vertically suspended above and spaced apart from the collection reservoir, and is shaped and/or sized to substantially prevent fluid backsplash from the collection reservoir and into the pathway through which air flows.

The housing further includes a clean air collector tube suspended vertically above and spaced apart from the drain funnel and configured to allow air to flow therethrough via an outlet port coupled to the clean air collector tube and configured to exhaust treated air.

The clean air collector includes a bell-mouth shaped first end adjacent to the drain funnel and second opposing end. The bell-mouth shaped first end of the clean air collector tube has a larger diameter than the second opposing end of the clean air collector tube, wherein such a design (i.e., the shape and size) of the bell-mouth shaped first end is configured to reduce the speed of air flowing into and through the clean air collector tube to thereby prevent migration of any contaminants deposited along a wall or lip of the bell-mouth shaped first end toward the second opposing end of the clean air collector tube. Furthermore, the lip of the bell-mouth shaped first end is shaped to cause contaminants deposited along a wall of the bell-mouth shaped first end to coalesce into larger deposits along the lip. In particular, the lip may generally have a slim or thin profile, thereby reducing the amount of surface area available and thus reducing surface tension and preventing any contaminant deposits to remain on the collector tube. As such, the combination of the slow air speed and reduced surface tension effectively eliminates any chance of contaminant deposits migrating towards and interior of the tube. Rather, contaminant deposits will drip down on the drain funnel and subsequently into the collection reservoir.

The housing of the air-fluid separator device is coupled to a collection reservoir configured to collect and retain contaminants that have been separated from the incoming air. In some embodiments, the collection reservoir and housing are releasably coupled to one another (e.g., via a bayonet mount-style connection). In particular, the collection reservoir may include at least one slot defined along the perimeter thereof that is shaped and/or sized to receive a corresponding pin provided on the housing upon mounting and subsequent rotation of the collection reservoir relative to the housing. For example, at least one slot may have a hook latch design. The device further includes a spring member (i.e., a wave spring or the like) that provides an opposing force to effectively lock a given pin of the housing within a corresponding slot (i.e., a hook latch portion) of the collection reservoir. Accordingly, the bayonet mount-style connection provides a quick-release connection, improving the ease with which to connect and remove the collection reservoir, and further eliminates the need for a sight glass, thereby resulting in improved durability at higher operating temps and a user does not have to struggle to interpret a hard-to-read sight glass to check a fluid level. A user need only to push up and twist the collection reservoir (e.g., an ⅛ of a turn) to engage or disengage the collection reservoir from the housing. This quick-release connection allows for a user to easily remove the collection reservoir and inspect the fluid level without multiple turns of unscrewing required.

It should be noted that, in some embodiments, the housing of the air-fluid separator device and the collection reservoir are fixed to one another.

The device may further include a locking clip configured to lock the collection reservoir into engagement with the housing as a safety measure. In particular, the locking clip may simply be placed into engagement within a gap defined between the housing and the collection reservoir when the housing and collection reservoir are coupled to one another. In order to disengage and remove the collection reservoir from the housing, the collection reservoir must be pushed toward the housing (to allow a given pin to clear the hook in the latch portion of the slot) and then rotated to release the pin from the slot. The locking clip fills the gap present between the housing and collection reservoir, thereby preventing the collection reservoir from being moveable towards the housing, thereby maintaining a given pin within the hook of the latch portion and preventing disengagement and removal of the collection reservoir from the housing. As such, the locking clip is a safety feature to ensure that the collection reservoir cannot be removed accidentally or in the event of a hard impact.

The air-fluid separator device further includes a universal mounting bracket. The mounting bracket may generally include a 90-degree bracket, in which a mounting plate of the bracket includes a plurality of apertures circumferentially provided thereon. The housing includes a pin (also referred to as a locating feature) to effectively lock the mounting bracket into a specific mounting position when the pin is engaged with one of the plurality of apertures. The mounting bracket is held into place against the housing via a retaining nut (i.e., the retaining nut can be releasably coupled to the housing via a threaded engagement to thereby sandwich the mounting plate between the nut and the housing). The plurality of apertures circumferentially arranged allows for the mounting plate (and thus the bracket) to be clocked in many different orientations depending on the particular orientation needed for the given application.

BRIEF DESCRIPTION OF THE DRAWINGS

Features and advantages of the claimed subject matter will be apparent from the following detailed description of embodiments consistent therewith, which description should be considered with reference to the accompanying drawings.

FIG. 5B illustrates airflow through the separator components.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention is directed to an air-fluid separator device comprising a plurality of uniquely designed separator components cooperatively arranged to define a pathway through which untreated and potentially contaminated air flows and undergoes treatment in which contaminants, which may be in the form of fluid-based contaminants, are removed from the air before the air is reused (e.g., returned to an intake manifold of an engine).

The air-fluid separator device of the present disclosure may generally be used with engines, particularly for separating oil from air. However, it should be noted that the air-fluid separator device may be used for separating various contaminants from air, including, but not limited to, water, oil, carbon particles, and unburned fuel, for example.

The air-fluid separator may be used in a variety of applications. For example, the air-fluid separator may be used in direct injection engines, which typically suffer from excessive carbon build-up on the valves and require regular cleaning. The air-fluid separator will help reduce carbon build up on the valves by removing contaminants from the air prior to returning said air to the intake manifold of the engine. It should be noted that any engine with oil residue found in the intake manifold, throttle body, intake piping, or charge cooler will benefit greatly from the addition of the air-fluid separator of the present disclosure. Furthermore, any engine with an aftermarket tune will benefit and see improvements in horsepower from the increase in octane of the air/fuel mixture after the addition of the air-fluid separator of the present disclosure. The air-fluid separator device is also well-suited for use in recirculated, OEM style PCV systems. The air-fluid separator device can also be used in vent-to-atmosphere applications (with the addition of a filter attachment).

Figure 1A:
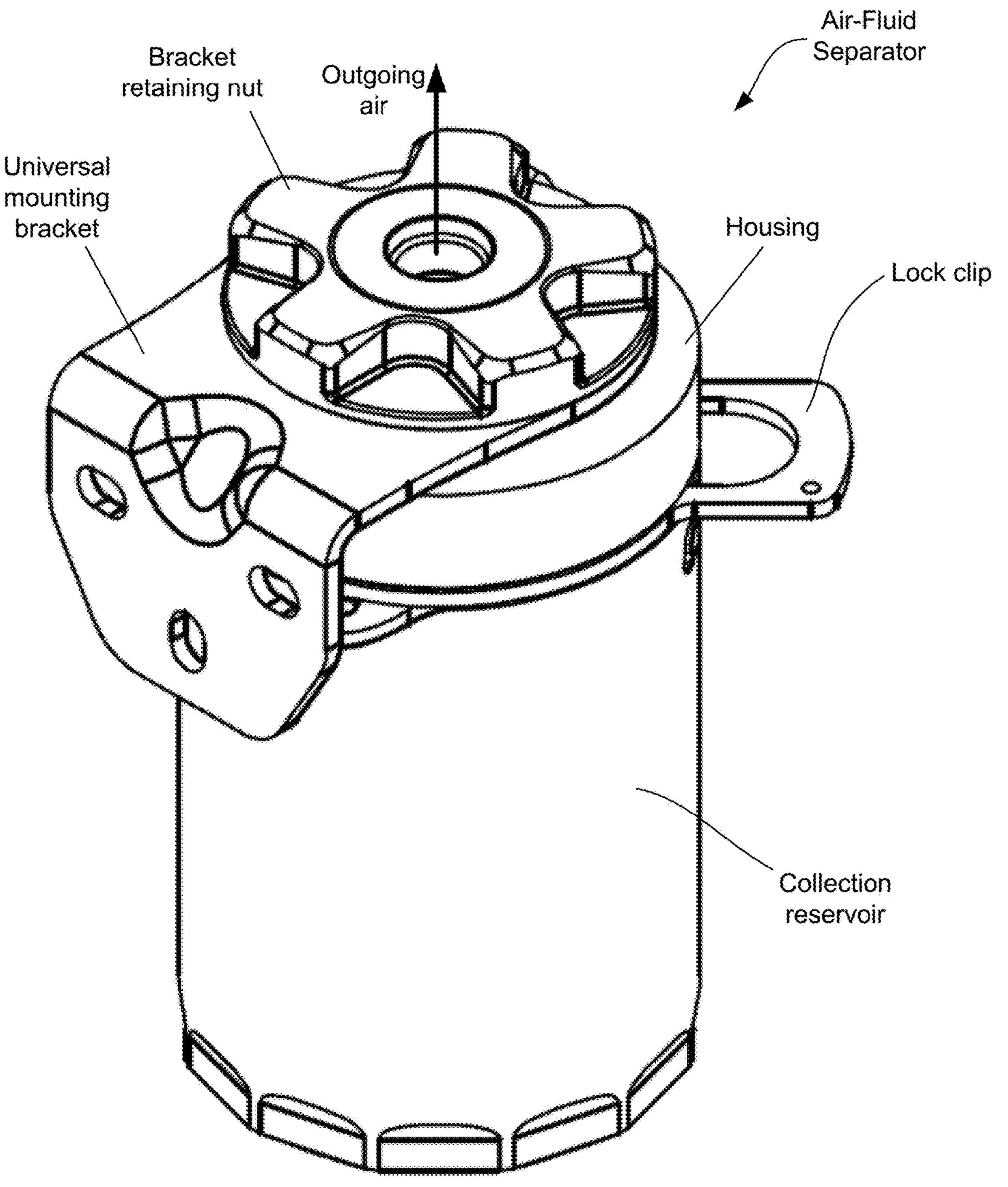
FIGS. 1A and 1B are perspective views illustrating an air-fluid separator consistent with the present disclosure, including a housing releasably coupled to a collection reservoir.
Figure 1B:
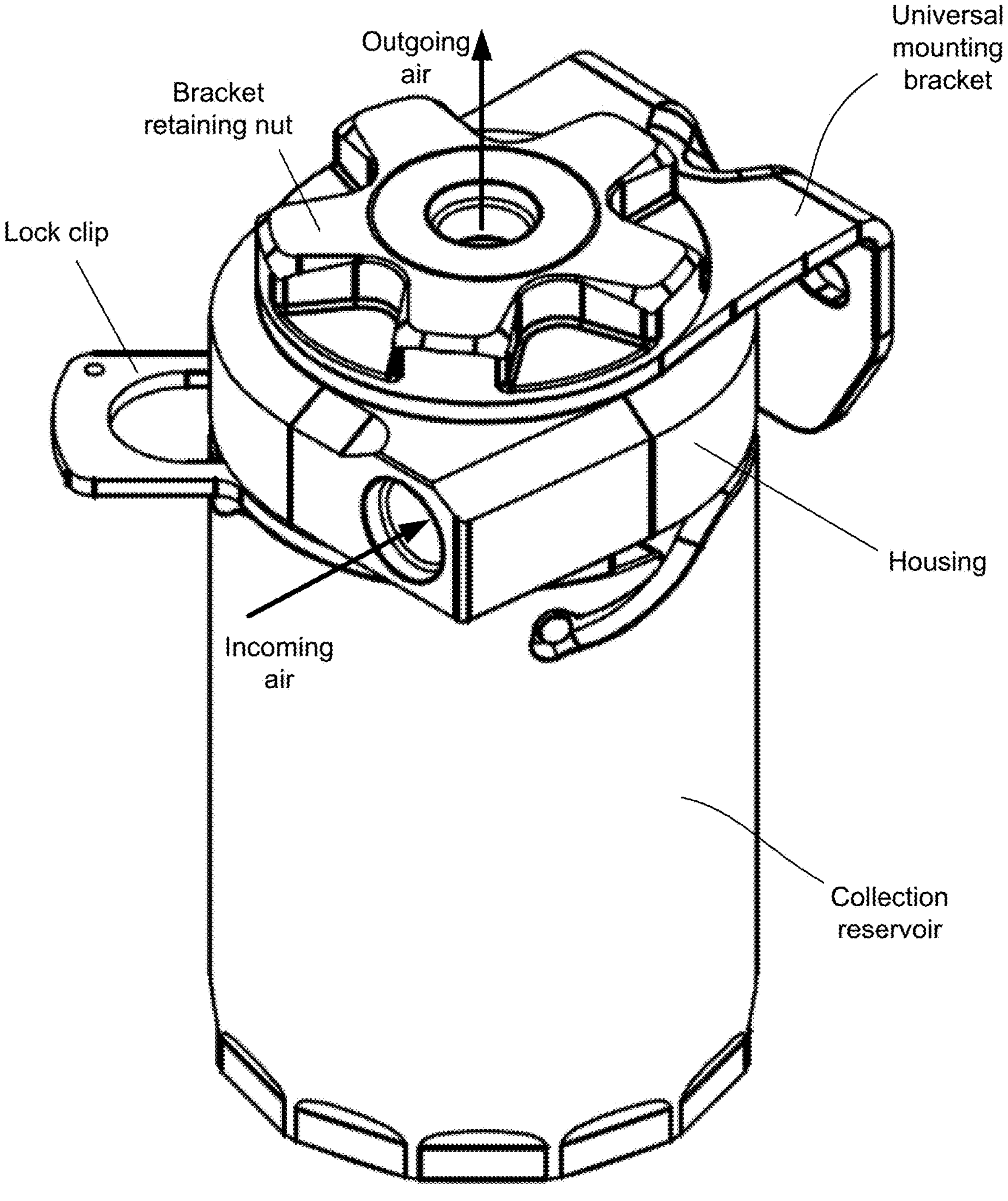

FIGS. 1A and 1B are perspective views illustrating an air-fluid separator consistent with the present disclosure, including a housing that can be releasably coupled to a collection reservoir. As shown, the air-fluid separator includes a housing releasably coupled to a collection reservoir via a bayonet mount-style connection, as described in greater detail herein. However, it should be noted that, in other embodiments, the housing and collection reservoir may be fixedly coupled to one another.

The housing includes an inlet port (for receiving incoming air) and an outlet port (for exhausting air that has passed through a pathway within the housing that is defined by uniquely designed separator components cooperatively arranged within the housing). The incoming air may generally be considered untreated (i.e., it has not yet passed through an air-fluid separator) and thus may potentially contain contaminants within. The contaminants may include, but are not limited to, water, oil, carbon particles, and unburned fuel, for example. By passing into the housing and through the pathway defined therein, the incoming air undergoes treatment in which contaminants are separated from the air and then treated, or clean, air is then exhausted from the outlet port of the housing, while the contaminants are ultimately collected within the collection reservoir.

The air-fluid separator is shown in a fully assembled state, including a universal mounting bracket coupled to the housing and a lock clip in an engaged position (to effectively lock the collection reservoir into engagement with the housing).

Figure 2:
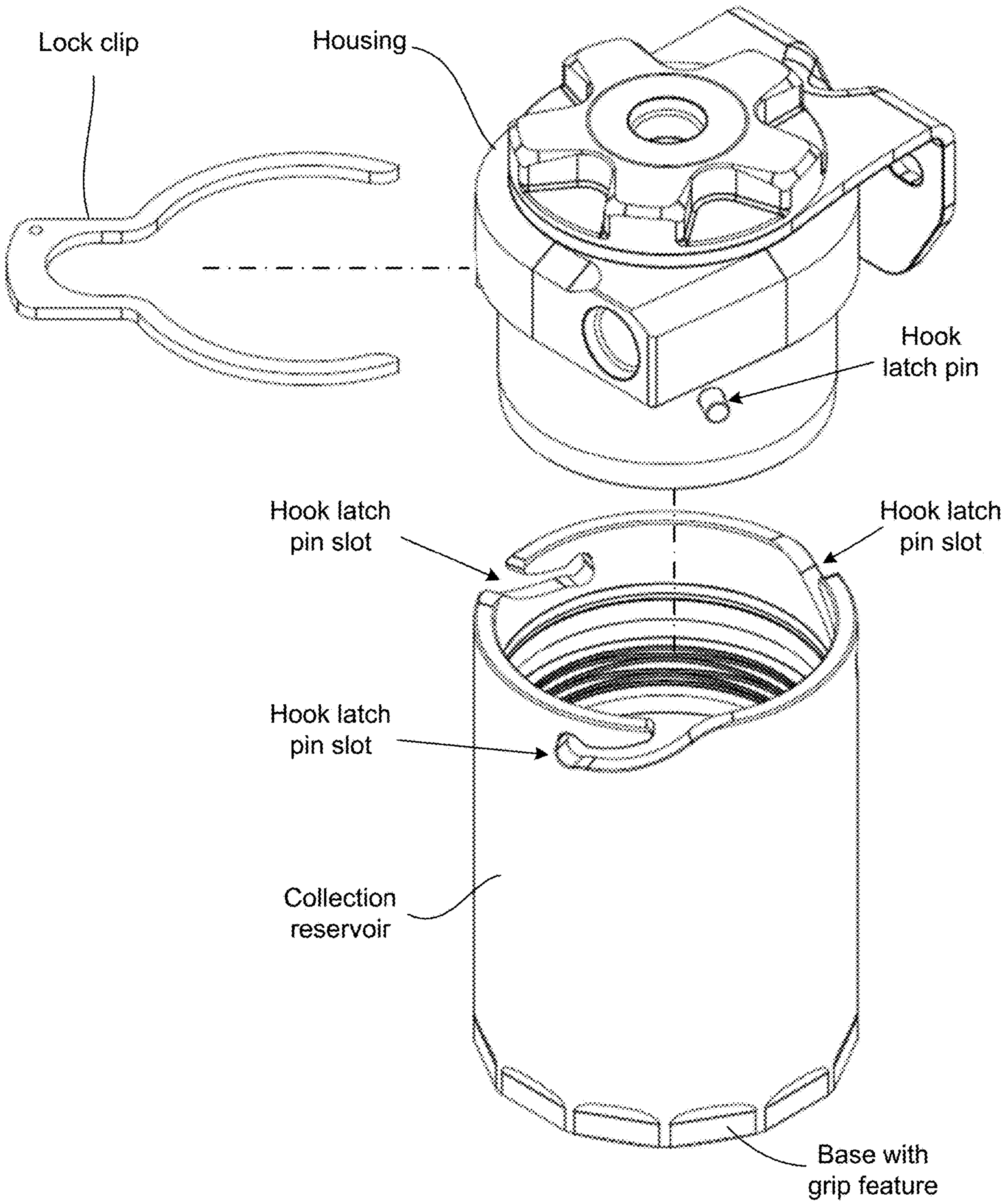
FIG. 2 is a perspective view illustrating the housing separated from the collection reservoir and the lock clip removed therefrom.

FIG. 2 is a perspective view illustrating the housing separated from the collection reservoir and the lock clip removed therefrom. As shown, the collection reservoir and housing are releasably coupled to one another via a bayonet mount-style connection. In particular, the collection reservoir may include multiple slots defined along perimeter thereof that are shaped and/or sized to receive a corresponding pin provided on the housing upon mounting and subsequent rotation of the collection reservoir relative to the housing. For example, the slots may have a hook latch design. The device further includes a spring member (i.e., a wave spring or the like, shown in FIGS. 5A and 5B) that provides an opposing force to effectively lock a given pin of the housing within a corresponding slot (i.e., a hook latch portion) of the collection reservoir.

Accordingly, the bayonet mount-style connection provides a quick-release connection, improving the ease with which to connect and remove the collection reservoir, and further eliminates the need for a sight glass, thereby resulting in improved durability at higher operating temps and a user does not have to struggle to interpret a hard-to-read sight glass to check a fluid level. A user need only to push up and twist the collection reservoir (e.g., an ⅛ of a turn) to engage or disengage the collection reservoir from the housing. This quick-release connection allows for a user to easily remove the collection reservoir and inspect the fluid level without multiple turns of unscrewing required.

The device further includes a locking clip configured to lock the collection reservoir into engagement with the housing as a safety measure. In particular, the locking clip may simply be placed into engagement within a gap defined between the housing and the collection reservoir when the housing and collection reservoir are coupled to one another. In order to disengage and remove the collection reservoir from the housing, the collection reservoir must be pushed toward the housing (to allow a given pin to clear the hook in the latch portion of the slot) and then rotated to release the pin from the slot. The locking clip fills the gap present between the housing and collection reservoir, thereby preventing the collection reservoir from being moveable towards the housing, thereby maintaining a given pin within the hook of the latch portion and preventing disengagement and removal of the collection reservoir from the housing. As such, the locking clip is a safety feature to ensure that the collection reservoir cannot be removed accidentally or in the event of a hard impact.

Figure 3:
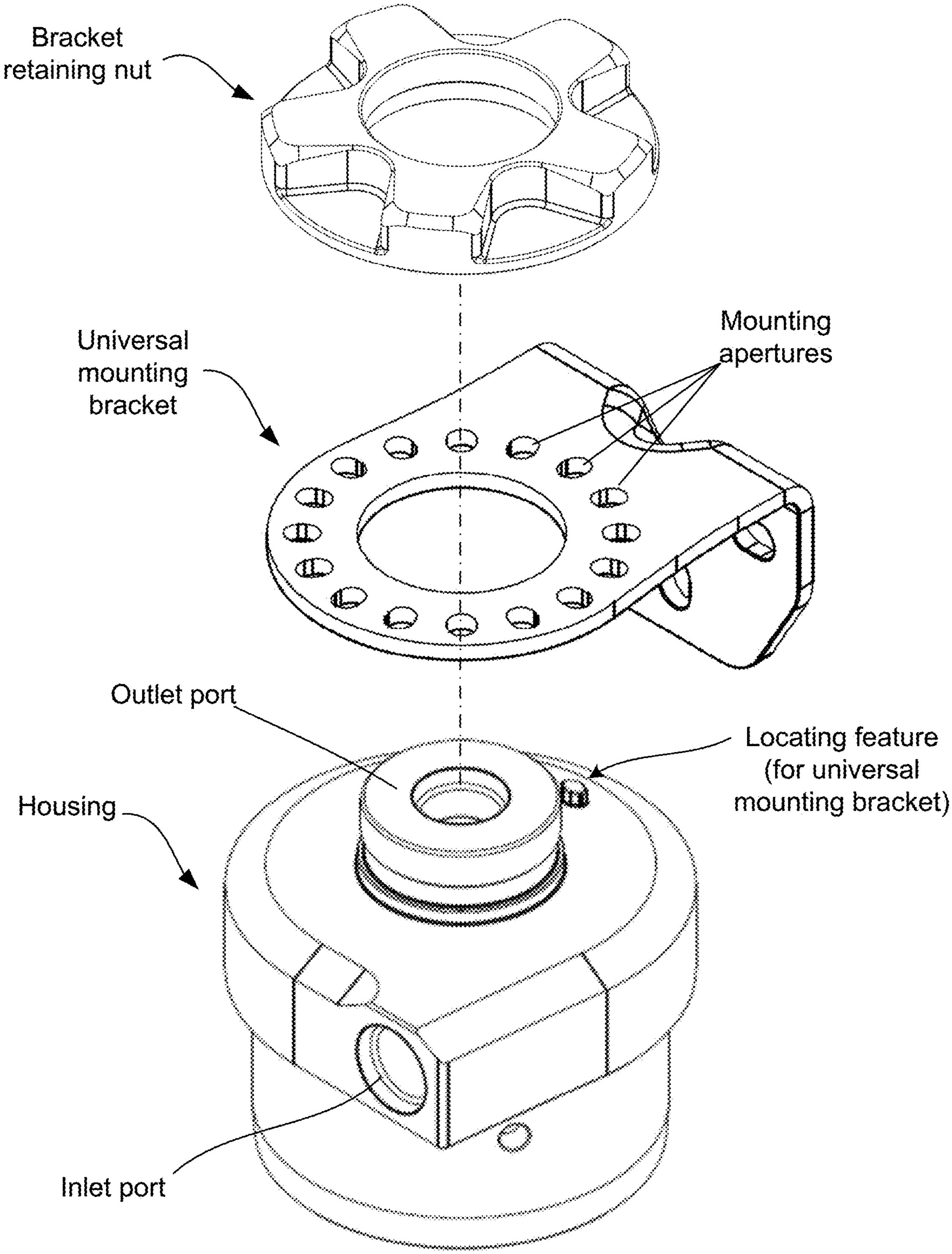
FIG. 3 is an enlarged perspective view illustrating the mounting bracket and bracket retaining nut separated from one another and the housing.

FIG. 3 is an enlarged perspective view illustrating the mounting bracket and bracket retaining nut separated from one another and the housing. As shown, the mounting bracket may generally include a 90-degree bracket, in which a mounting plate of the bracket includes a plurality of apertures circumferentially provided thereon and surrounding a central bore. The central bore is sized to receive and accommodate the outlet port of the housing. The housing includes a pin (also referred to as a locating feature) to effectively lock the mounting bracket into a specific mounting position when the pin is engaged with one of the plurality of apertures. The mounting bracket is held into place against the housing via a retaining nut (i.e., the retaining nut can be releasably coupled to the housing via a threaded engagement to thereby sandwich the mounting plate between the nut and the housing). The retaining nut also includes a central bore that is sized to receive and accommodate the outlet port of the housing. Accordingly, when the bracket is installed and the retaining nut is tightened, the outlet port is unobstructed, as the central bore of the mounting bracket and retaining nut are concentrically aligned with one another and the outlet port, thereby allowing the clean air to be exhausted from the housing. The plurality of apertures circumferentially arranged on the mounting plate of the bracket allows for the mounting plate (and thus the bracket) to be clocked in many different orientations depending on the particular orientation needed for the given application.

Figure 4:
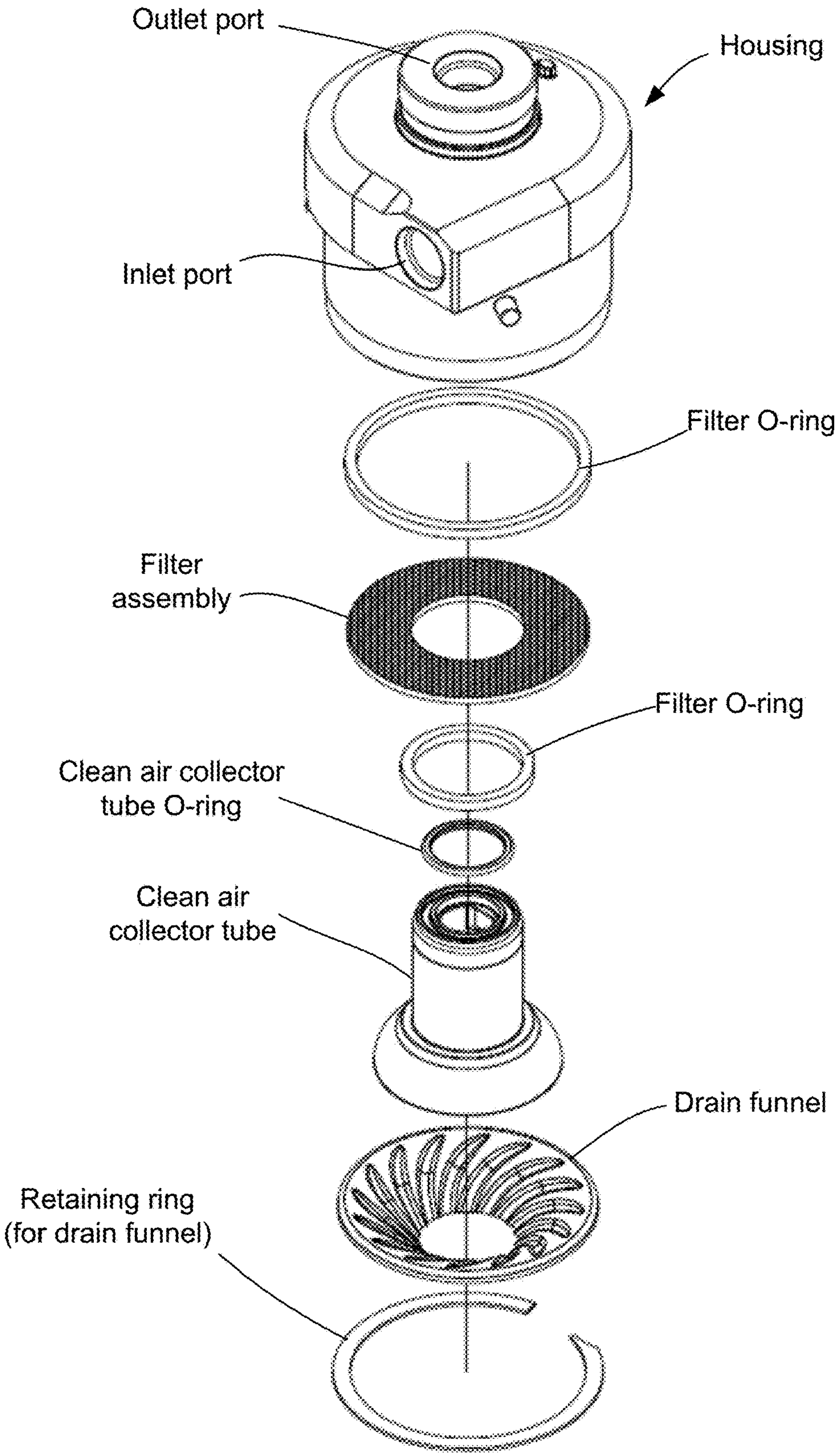
FIG. 4 is a perspective exploded view of the housing and various separator components.
Figure 5A:
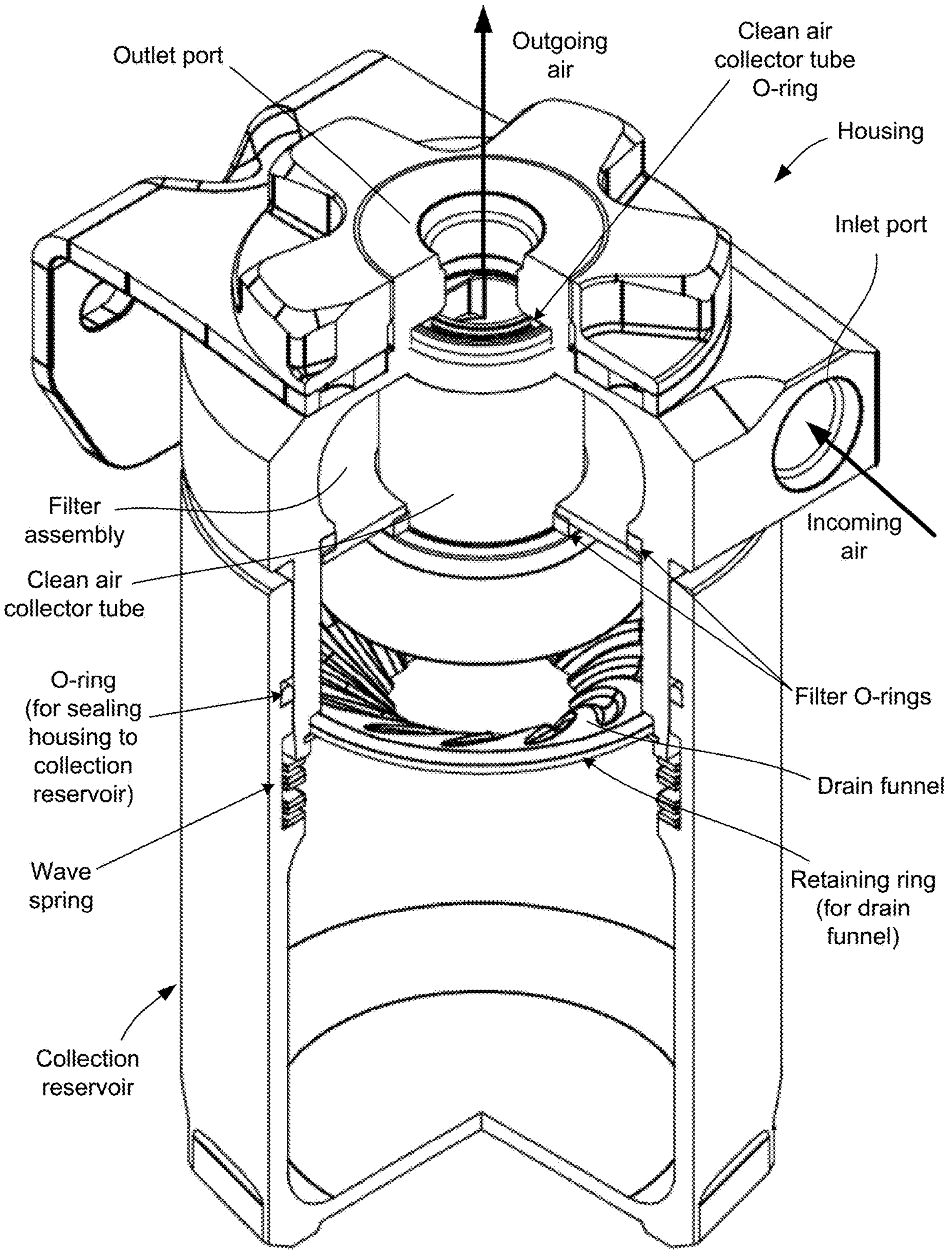
FIGS. 5A and 5B are perspective views, partly in section, illustrating an assembled air-fluid separator device in which the housing and collection reservoir are coupled to one another and the various separator components are cooperatively arranged to define a pathway through which untreated and potentially contaminated air flows and undergoes treatment in which contaminants are removed therefrom.
Figure 5B:
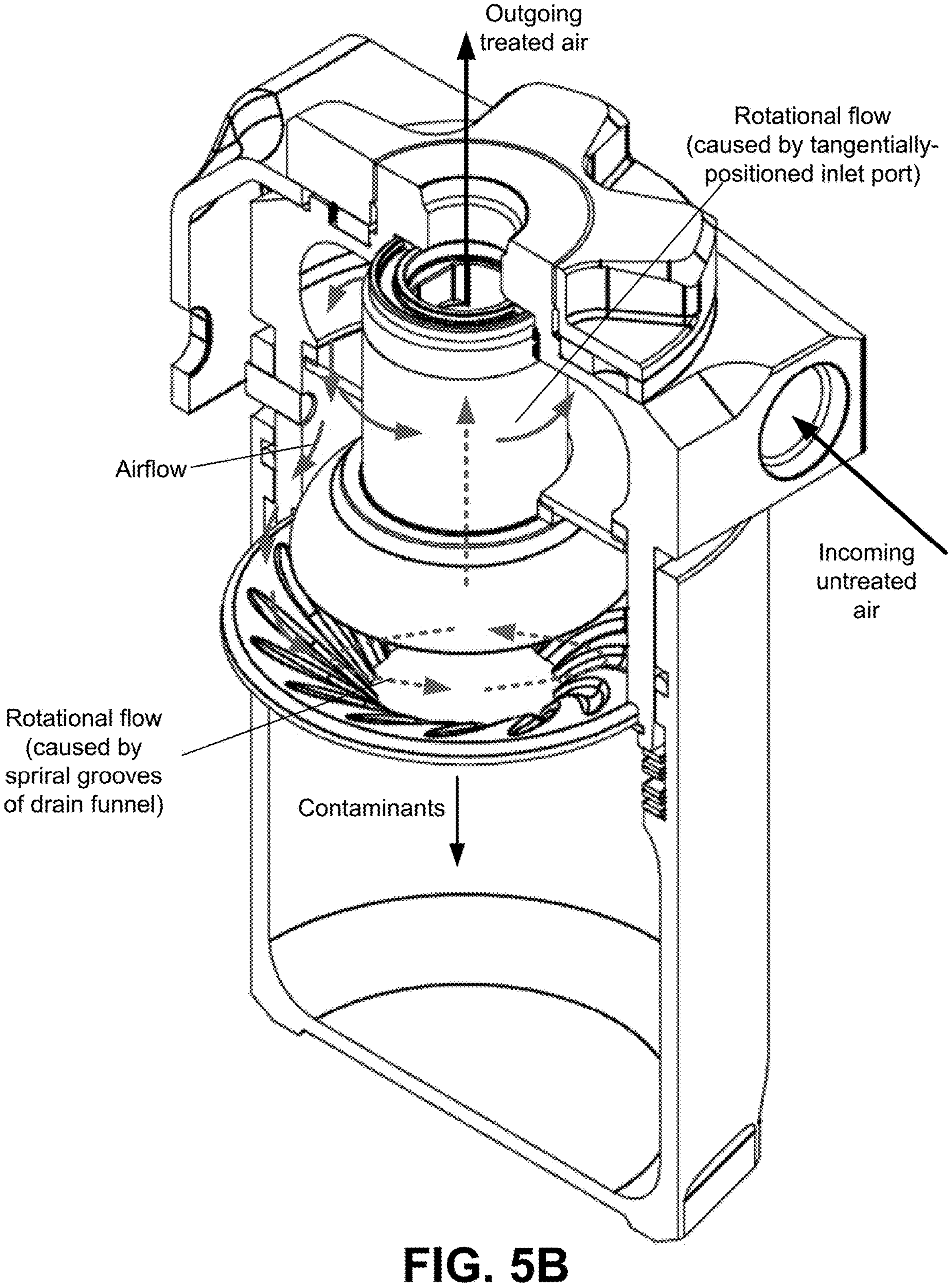

FIG. 4 is a perspective exploded view of the housing and various separator components. FIGS. 5A and 5B are perspective views, partly in section, illustrating an assembled air-fluid separator device in which the housing and collection reservoir are coupled to one another and the various separator components are cooperatively arranged to define a pathway through which untreated and potentially contaminated air flows and undergoes treatment in which contaminants are removed therefrom. FIG. 5B illustrates airflow through the separator components.

As shown, the inlet port is configured to receive untreated and potentially contaminated air and direct the air to flow into a separation chamber. In some embodiments, the inlet port may have a tangential orientation relative to an inner surface of the housing to thereby cause incoming untreated and potentially contaminated air to rotationally flow within the separation chamber of the housing and induce separation of contaminants from air and subsequent deposition of said separated contaminants along an outer perimeter of the separation chamber. Accordingly, the rotational flow caused by the tangential orientation of the inlet port relative to the inner surface of the housing, which forms a surface of the separation chamber, results in cyclonic separation action to occur within the separation chamber.

The housing further includes a filter assembly positioned adjacent to the separation chamber and configured to receive deposited contaminants from the separation chamber. The filter assembly is further configured to coalesce said deposited contaminants into larger deposits while allowing air to pass therethrough.

The filter assembly may generally be comprised of a plurality of vertically arranged filter layers, each filter layer comprising a different associated porosity. For example, the filter assembly may be composed of multiple layers (i.e., 2 layers, 3 layers, 4 layers, 5 layers, etc.) of different porosities of stainless steel meshes sintered together, wherein a top-most layer of the plurality of filter layers comprises finer porosity and a bottom-most layer of the plurality of filter layers comprises a coarser porosity. For example, a top-most mesh layer may include a finer porosity while the bottom-most mesh layer may include a coarser porosity. Such a configuration allows for coalescing deposited contaminants received from the separation chamber into gradually larger deposits as the deposited contaminants pass through the plurality of filter layers.

The device further includes at least a pair of O-rings with a square profile positioned on a top and a bottom of the filter assembly to help seal the edge of the filter assembly and prevent any air from bypassing the filter assembly. In some embodiments, rubber seals may be bonded directly to the inner and outer perimeters of the filter as a single assembly to eliminate the need for separate O-rings.

The housing further includes a drain funnel positioned adjacent to the filter assembly and secured to the housing via a retaining ring or the like. The drain funnel includes a plurality of spiral-shaped grooves formed along a collection surface thereof. The drain funnel serves multiple functions.

For example, the plurality of grooves are configured to collect contaminant deposits received from the filter assembly and direct the collected contaminant deposits towards a drain hole of the funnel and subsequently into a collection reservoir coupled to the housing. Furthermore, the plurality of grooves of the drain funnel are arranged to cause air flowing through the filter assembly to rotationally flow and thereby induce further separation of any residual fluid content from air and subsequent deposition of said separated residual fluid content along an inner surface of the housing surrounding the drain funnel. It should be noted that the plurality of spiral-shaped grooves are oriented so as to cause air to rotationally flow in the same direction as the rotational flow of air within the separation chamber.

Additionally, the drain funnel is vertically suspended above and spaced apart from the collection reservoir and is shaped and/or sized to substantially prevent fluid backsplash from the collection reservoir and into the pathway through which air flows. As such, the drain funnel essentially acts as a splash guard. Under high and varying G-loads, the fluids collected inside of the collection reservoir will likely splash around inside of the collection reservoir and migrate up the wall of the collection reservoir. The drain funnel keeps any fluid contained in the bottom of the reservoir and prevents it from splashing up past the drain funnel and thus prevents recontamination of air that will subsequently be exhausted through the outlet port or back up towards the filter assembly.

The housing further includes a clean air collector tube suspended vertically above and spaced apart from the drain funnel and configured to allow air to flow therethrough via an outlet port coupled to the clean air collector tube and configured to exhaust treated air.

The clean air collector includes a bell-mouth shaped first end adjacent to the drain funnel and second opposing end. The bell-mouth shaped first end of the clean air collector tube has a larger diameter than the second opposing end of the clean air collector tube, wherein such a design (i.e., the shape and size) of the bell-mouth shaped first end is configured to reduce the speed of air flowing into and through the clean air collector tube to thereby prevent migration of any contaminants deposited along a wall or lip of the bell-mouth shaped first end toward the second opposing end of the clean air collector tube.

Furthermore, the lip of the bell-mouth shaped first end is shaped so as to cause contaminants deposited along a wall of the bell-mouth shaped first end to coalesce into larger deposits along the lip. In particular, the lip may generally have a slim or thin profile, thereby reducing the amount of surface area available and thus reducing surface tension and preventing any contaminant deposits from remaining on the collector tube. As such, the combination of the slow air speed and reduced surface tension effectively eliminates any chance of contaminant deposits migrating towards and interior of the tube. Rather, contaminant deposits will drip down on the drain funnel and subsequently into the collection reservoir. The device further includes an O-ring positioned at the top of the air collector (i.e. at the second end) to seal it the tube against the housing and thereby prevent any air and fluid from bypassing at that connection point.

Accordingly, when fully assembled, the filter assembly is positioned below the separation chamber and above the drain funnel, such that the filter assembly is configured to receive deposited contaminants from the separation chamber while allowing air to pass therethrough towards the drain funnel. The drain funnel is positioned below the filter assembly and suspended above and spaced apart from the collection reservoir, such that the drain funnel is configured to collect contaminant deposits received from said filter assembly and direct said collected contaminant deposits towards a drain hole of the funnel and subsequently into a collection reservoir coupled to the housing. Finally, the clean air collector tube is suspended above and spaced apart from the drain funnel and further comprises a portion that extends through the filter assembly. In particular, as shown in the illustrated embodiments, the filter assembly has a cylindrical shape and surrounds a portion of the clean air collector tube. More specifically, the filter assembly may generally include a central bore through which a body of the clean air collector tube passes therethrough and is centrally positioned relative to the filter assembly.

Figure 6A:
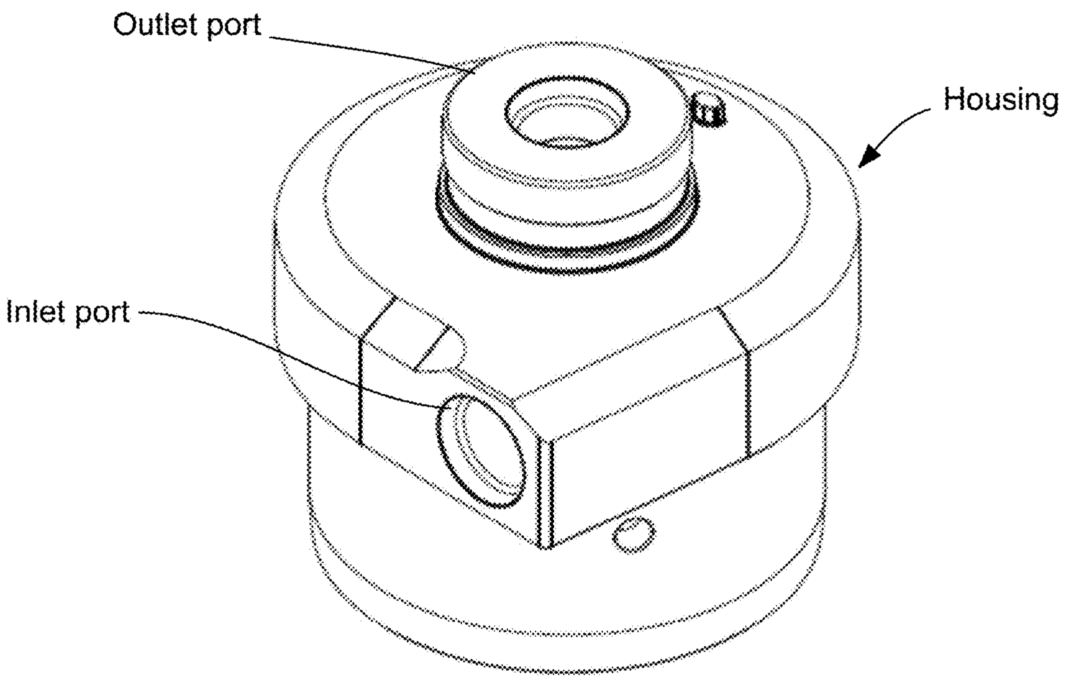
FIGS. 6A, 6B, and 6C are perspective and side views of the housing.
Figure 6B:
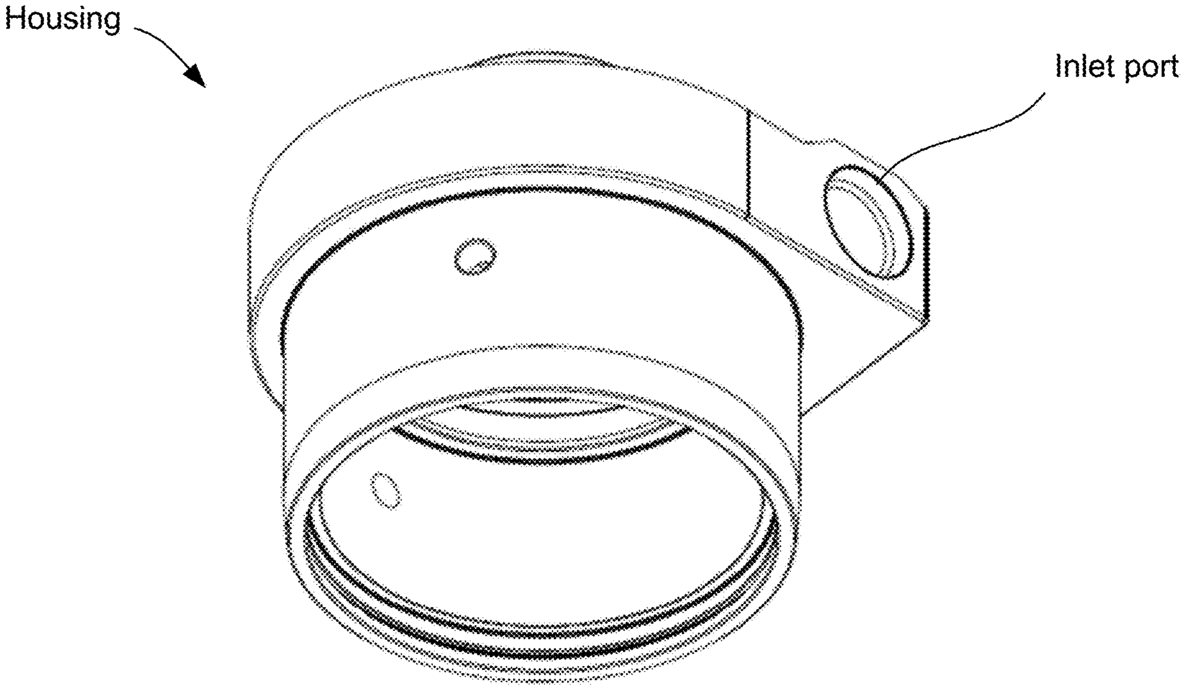
Figure 6C:
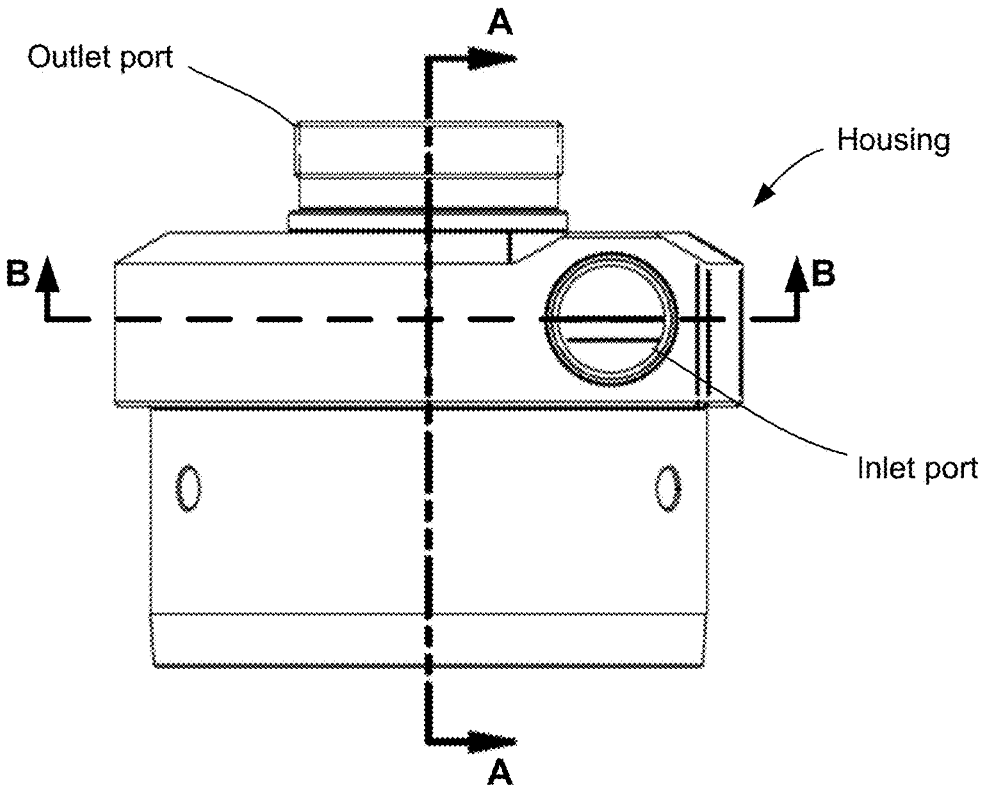
Figure 6D:
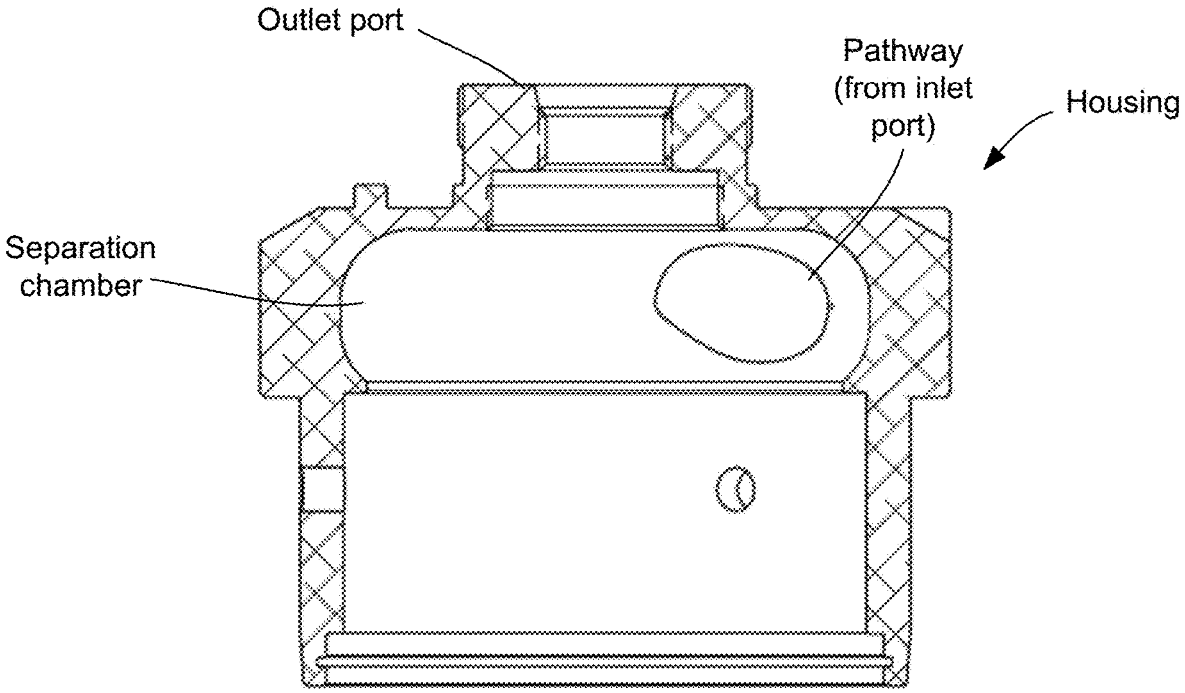
FIGS. 6D and 6E are cross-sectional views of the housing taken along lines A-A and B-B, respectively, of FIG. 6C.
Figure 6E:
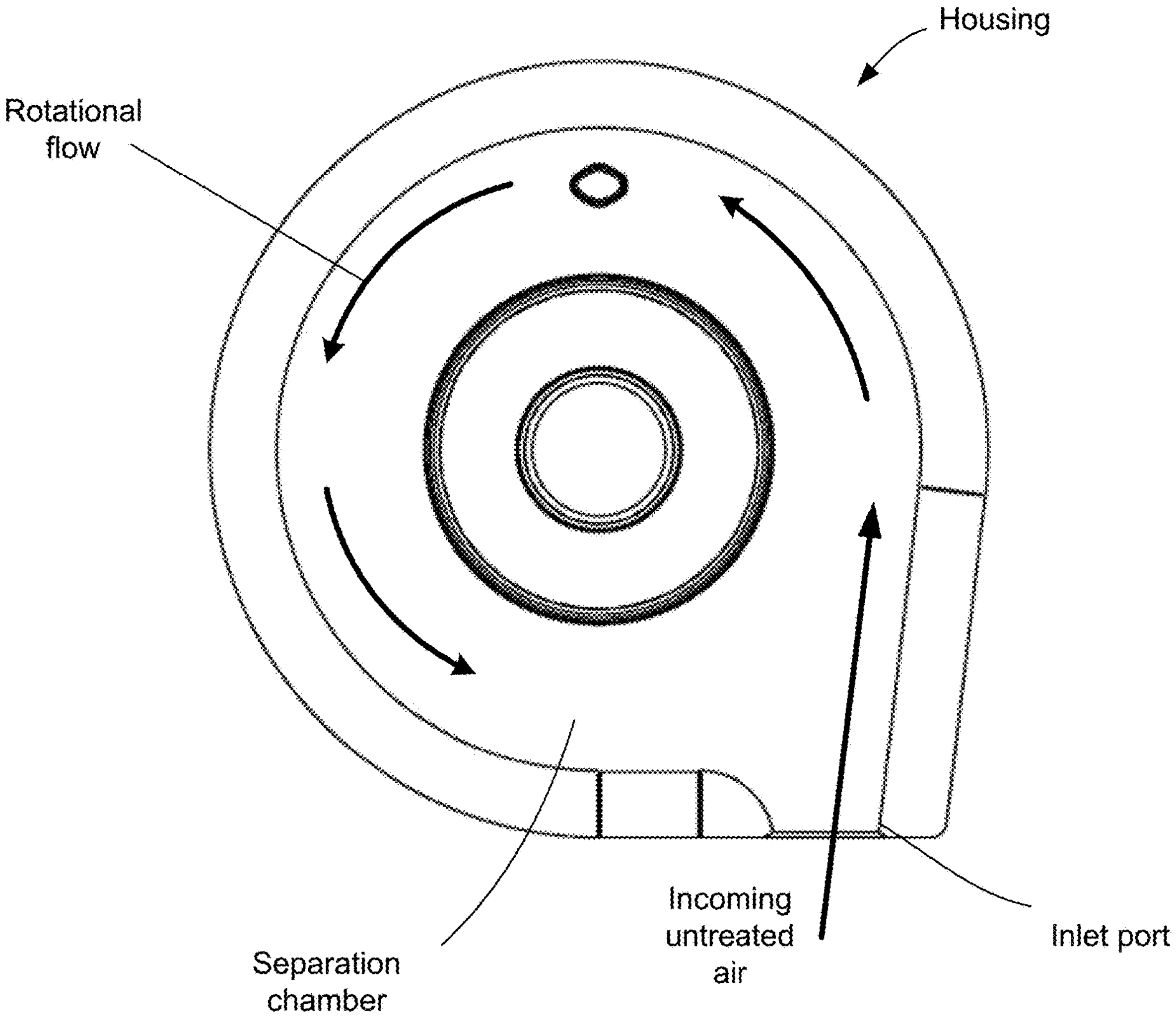

FIGS. 6A, 6B, and 6C are perspective and side views of the housing. FIGS. 6D and 6E are cross-sectional views of the housing taken along lines A-A and B-B, respectively, of FIG. 6C.

As shown, the inlet port may have a tangential orientation relative to an inner surface of the housing to thereby cause incoming untreated and potentially contaminated air to rotationally flow within the separation chamber of the housing and induce separation of contaminants from air and subsequent deposition of said separated contaminants along an outer perimeter of the separation chamber. Accordingly, the rotational flow caused by the tangential orientation of the inlet port relative to the inner surface of the housing, which forms a surface of the separation chamber, results in cyclonic separation action to occur within the separation chamber.

Figure 7A:
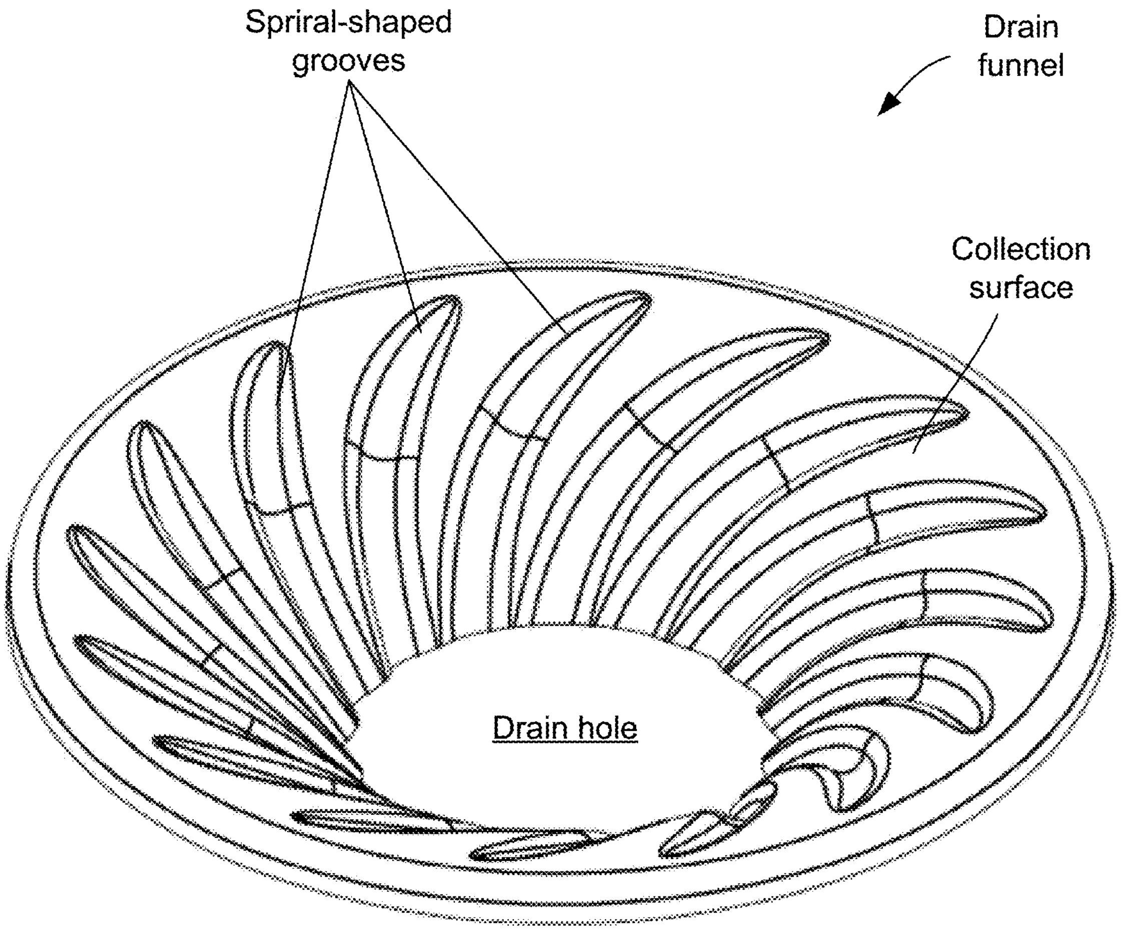
FIG. 7A is a perspective view of the drain funnel showing the collection surface with the plurality of spiral-shaped grooves formed thereon.
Figure 7B:
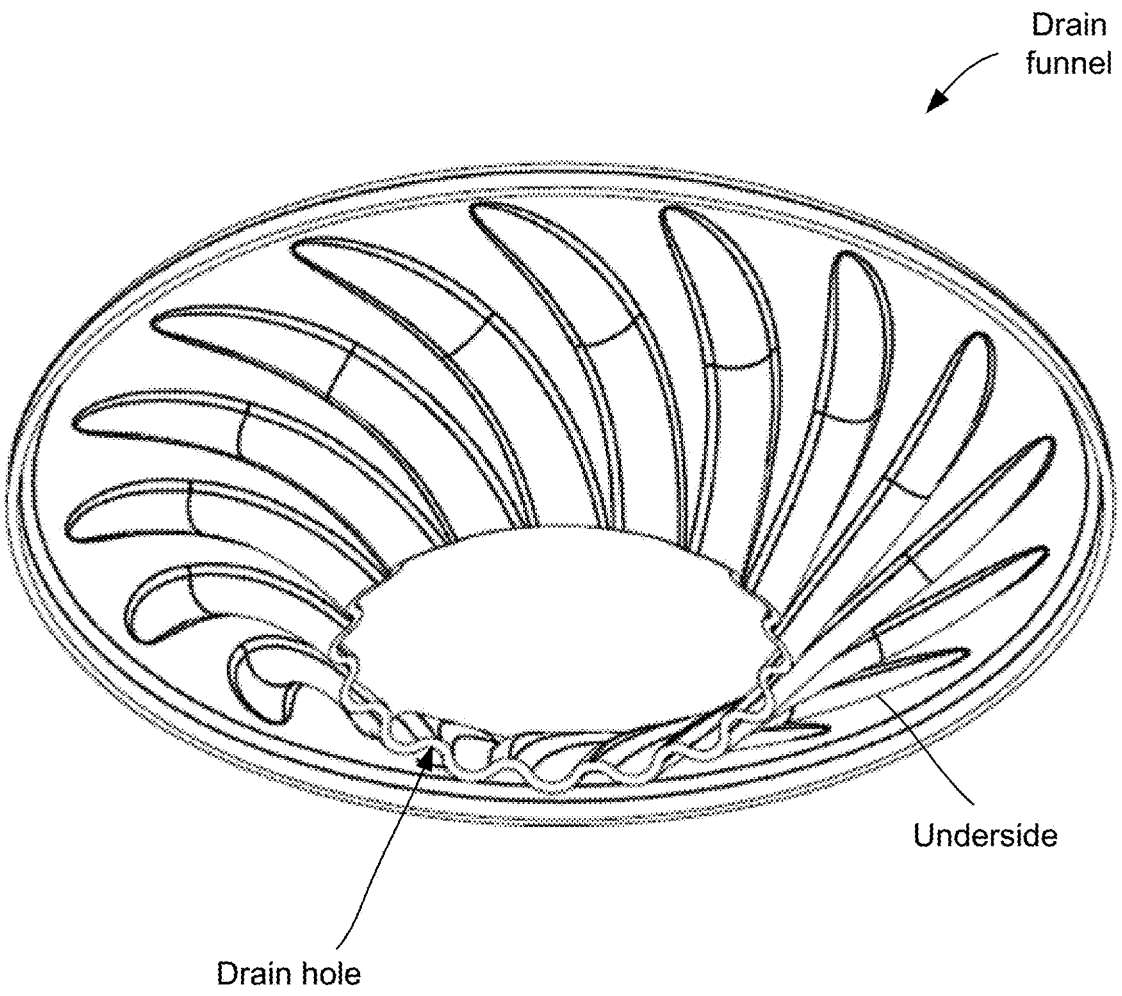
FIG. 7B is a perspective view showing the underside of the drain funnel.
Figure 7C:
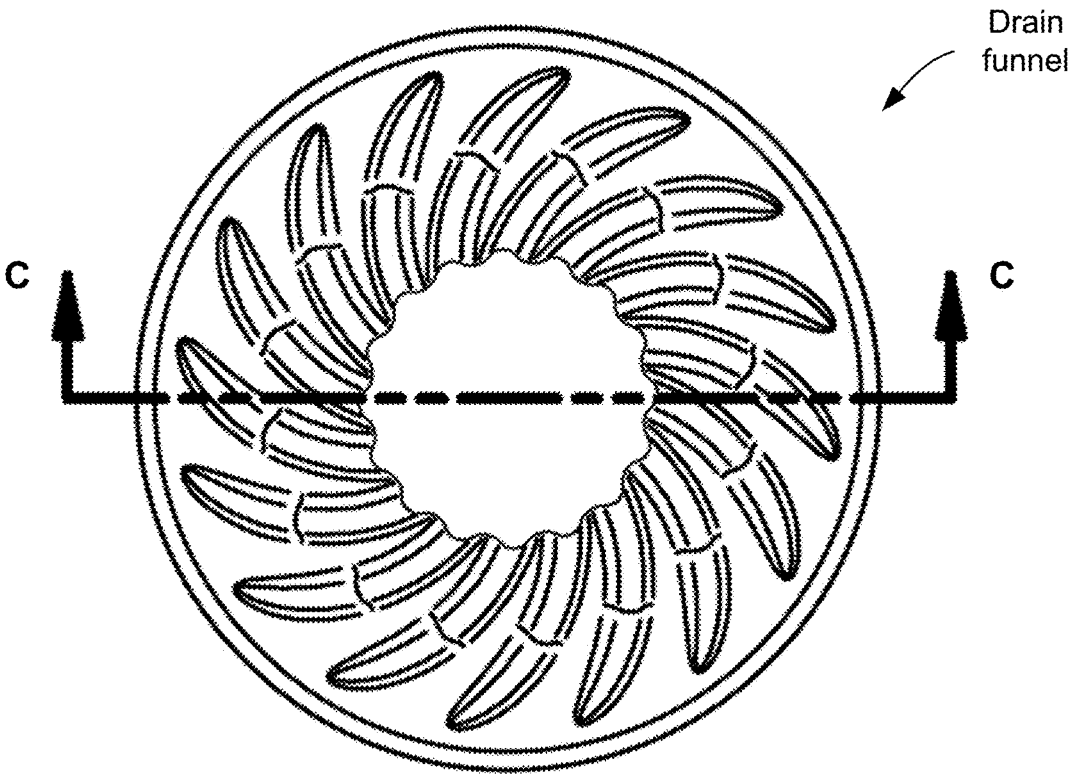
FIG. 7C is a side view of the drain funnel.
Figure 7D:
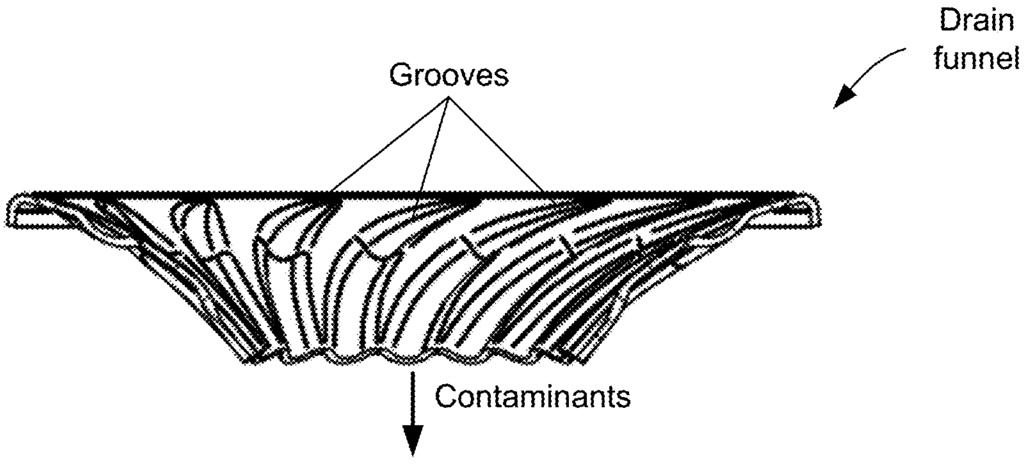
FIG. 7D is a cross-sectional view of the drain funnel taken along line C-C of FIG. 7C.

FIG. 7A is a perspective view of the drain funnel showing the collection surface with the plurality of spiral-shaped grooves formed thereon. FIG. 7B is a perspective view showing the underside of the drain funnel. FIG. 7C is a side view of the drain funnel. FIG. 7D is a cross-sectional view of the drain funnel taken along line C-C of FIG. 7C.

Figure 8A:
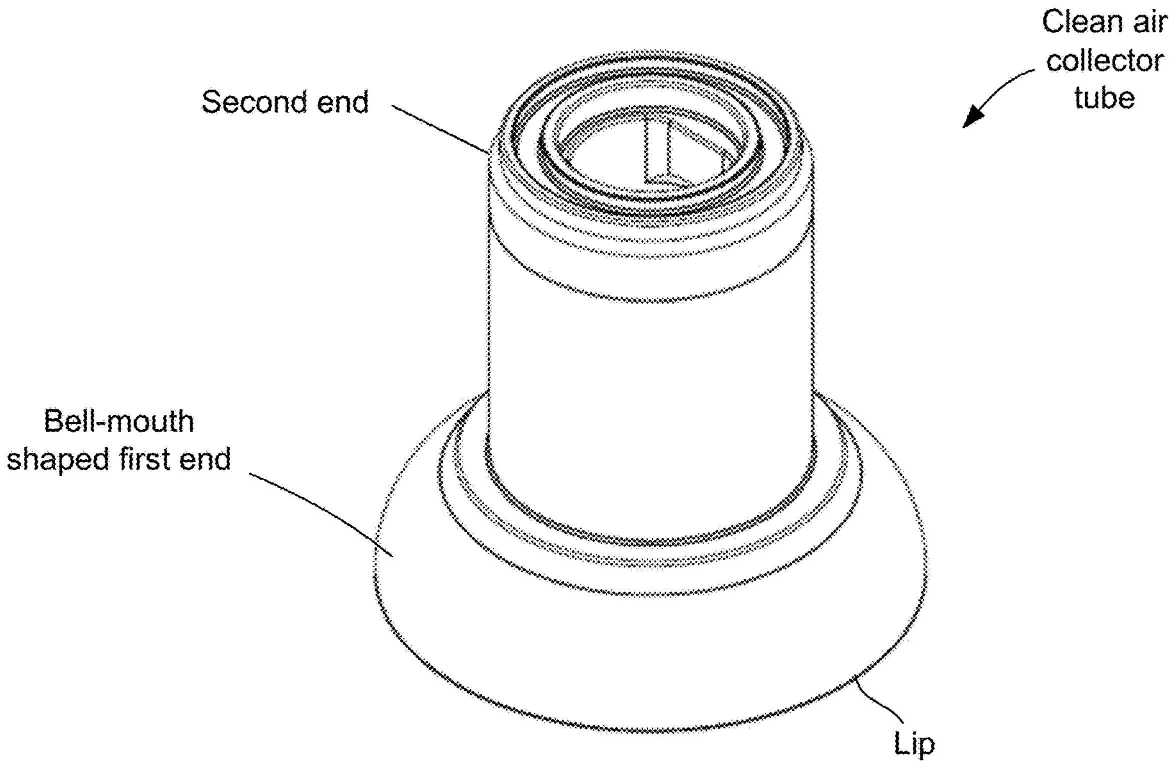
FIGS. 8A and 8B are perspective views of the clean air collector tube.
Figure 8B:
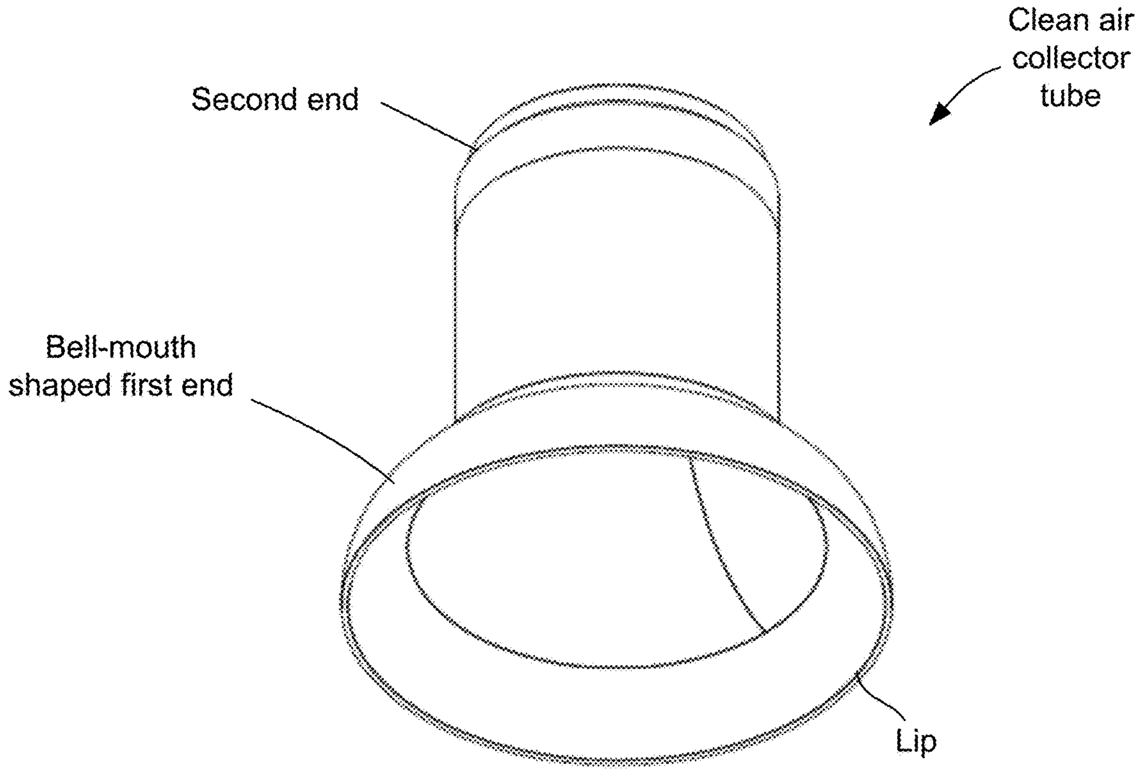
Figure 8C:
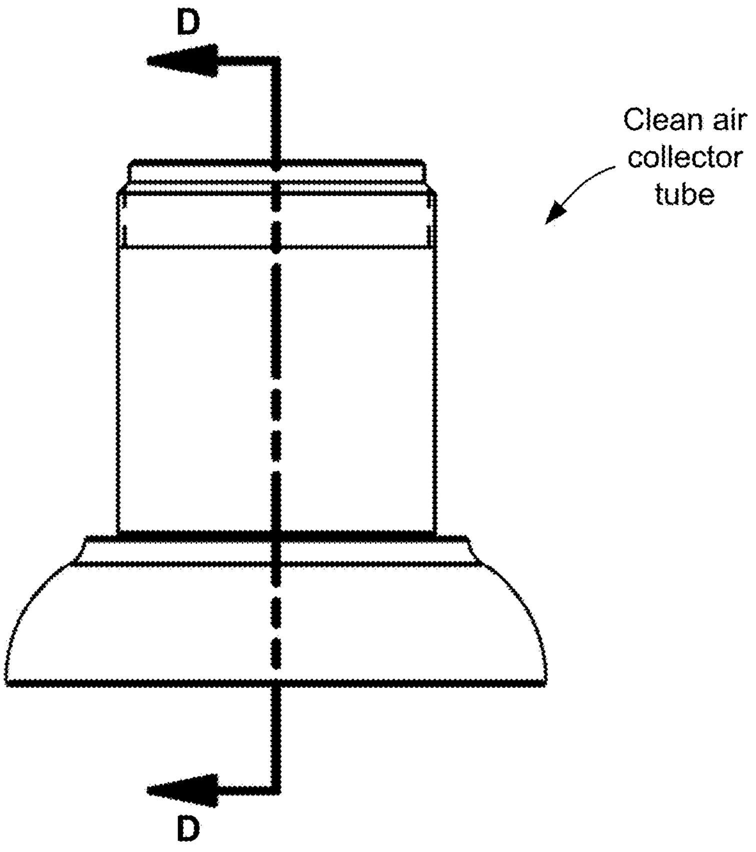
FIG. 8C is a side view of the clean air collector tube.
Figure 8D:
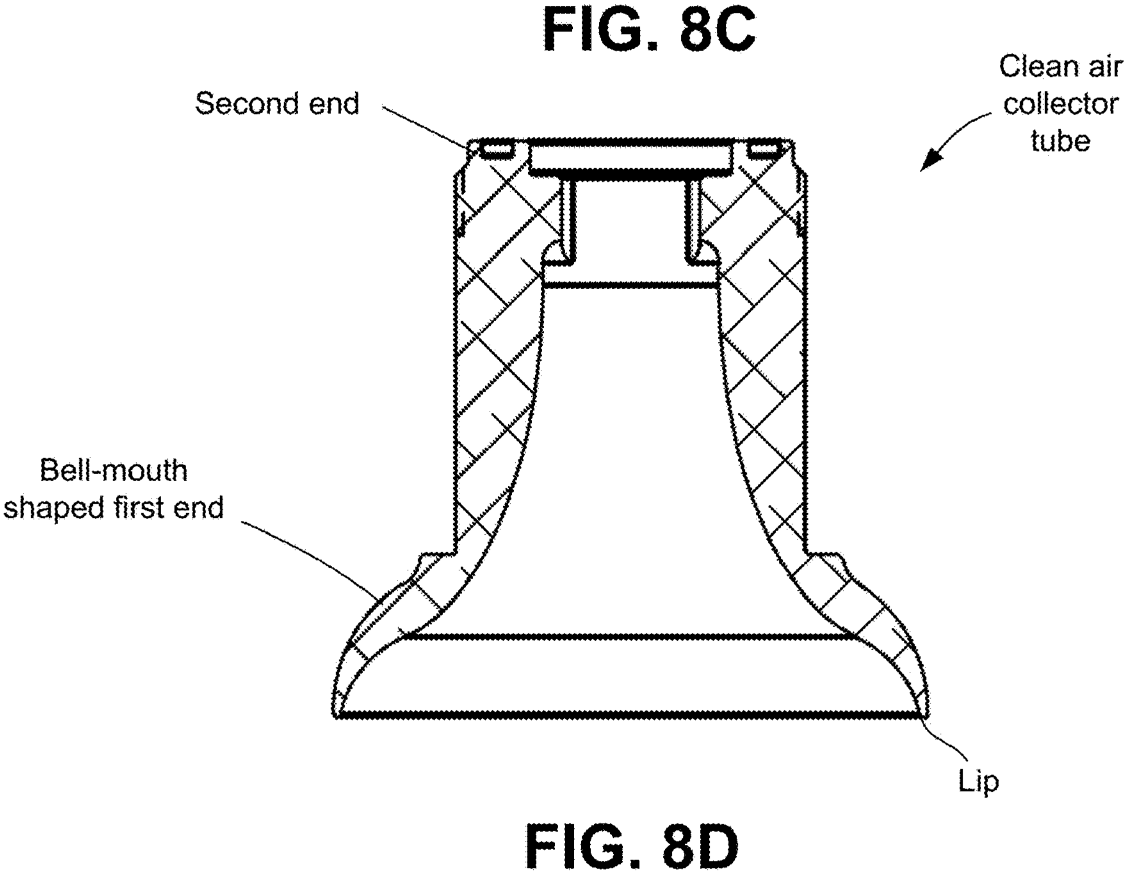
FIG. 8D is a cross-sectional view of the clean air collector tube taken along lines D-D of FIG. 8C.

FIGS. 8A and 8B are perspective views of the clean air collector tube. FIG. 8C is a side view of the clean air collector tube. FIG. 8D is a cross-sectional view of the clean air collector tube taken along lines D-D of FIG. 8C.

Figure 9A:
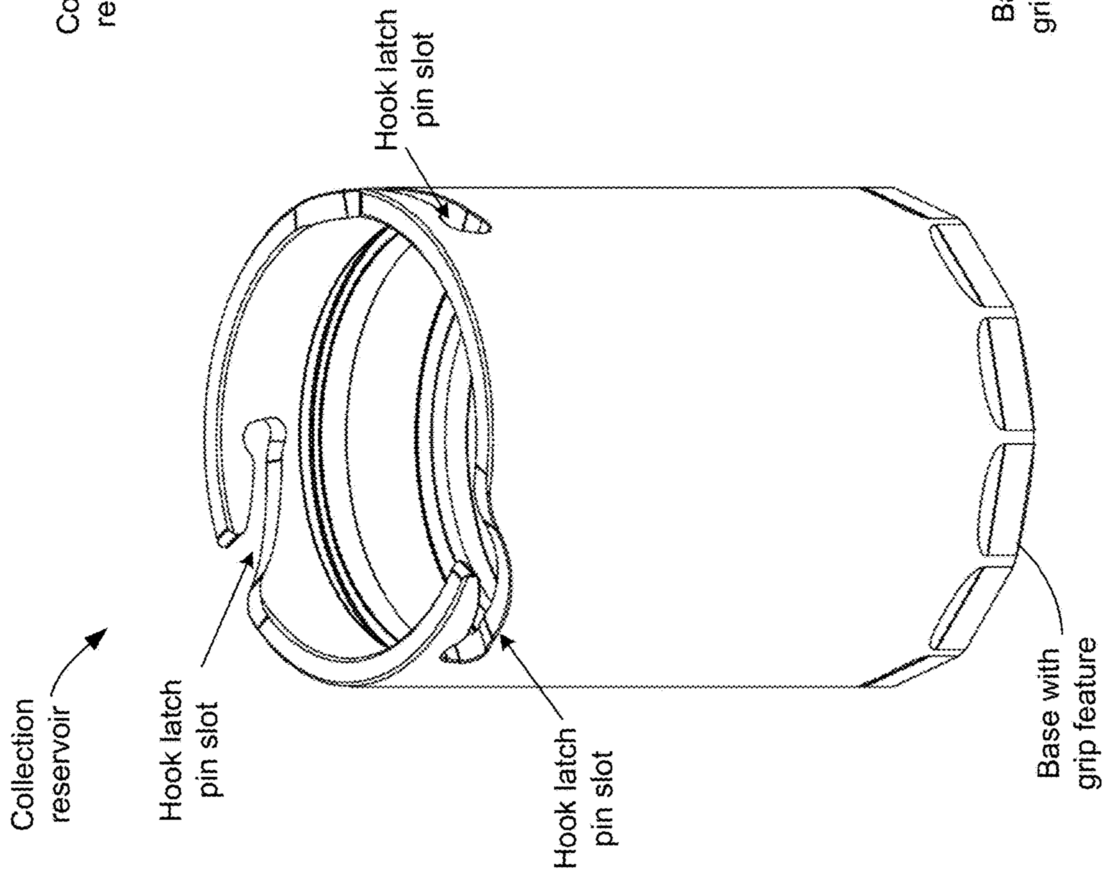
FIGS. 9A and 9B are perspective views of the collection reservoir.
Figure 9B:
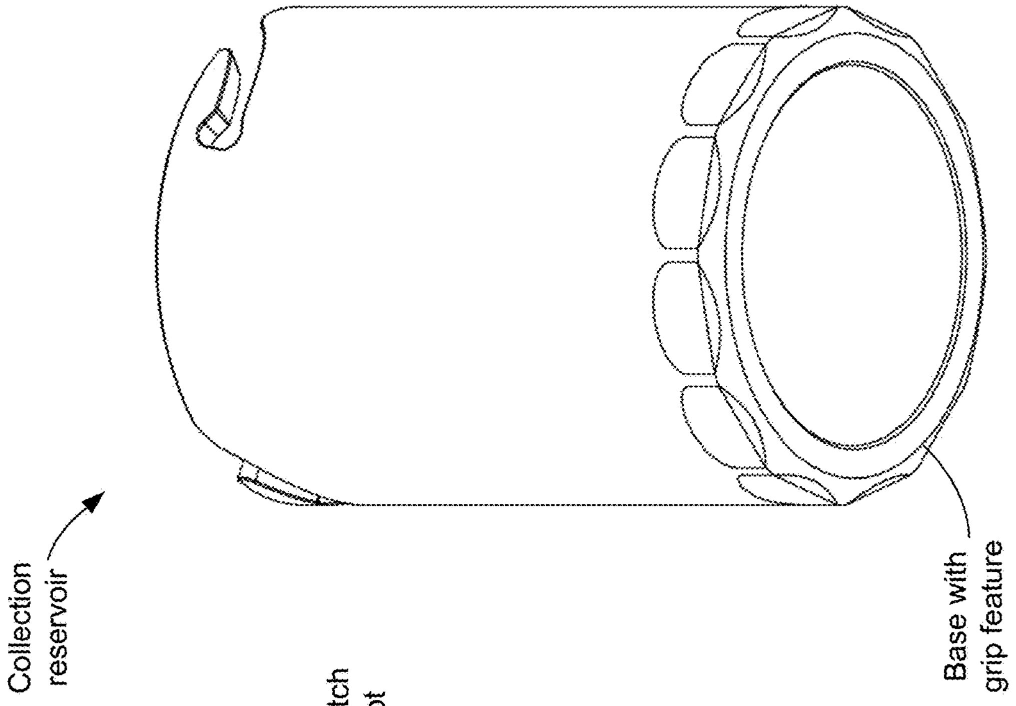
Figure 9C:
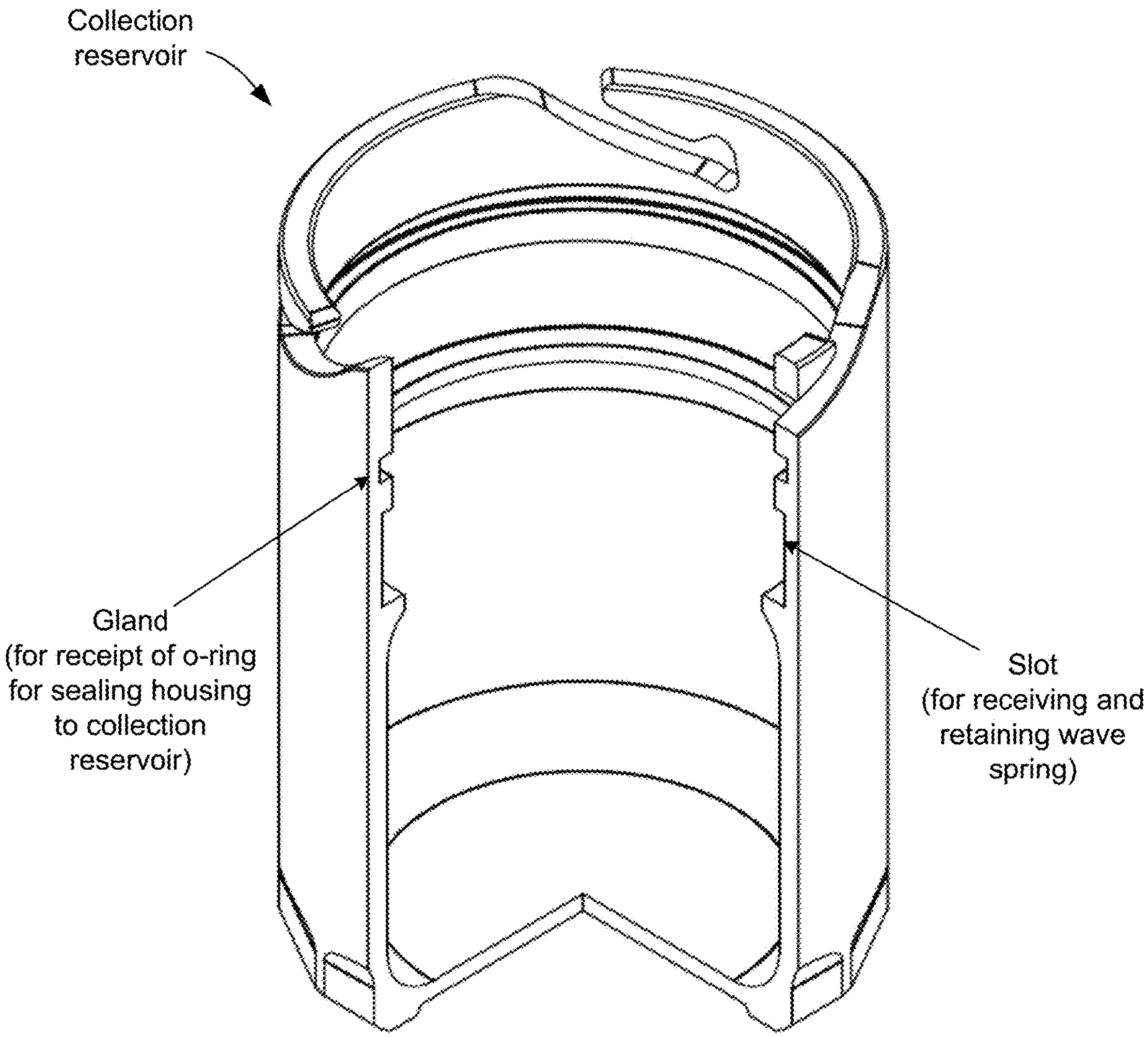
FIG. 9C is a perspective view, partly in section, of the collection reservoir.
Figure 9E:
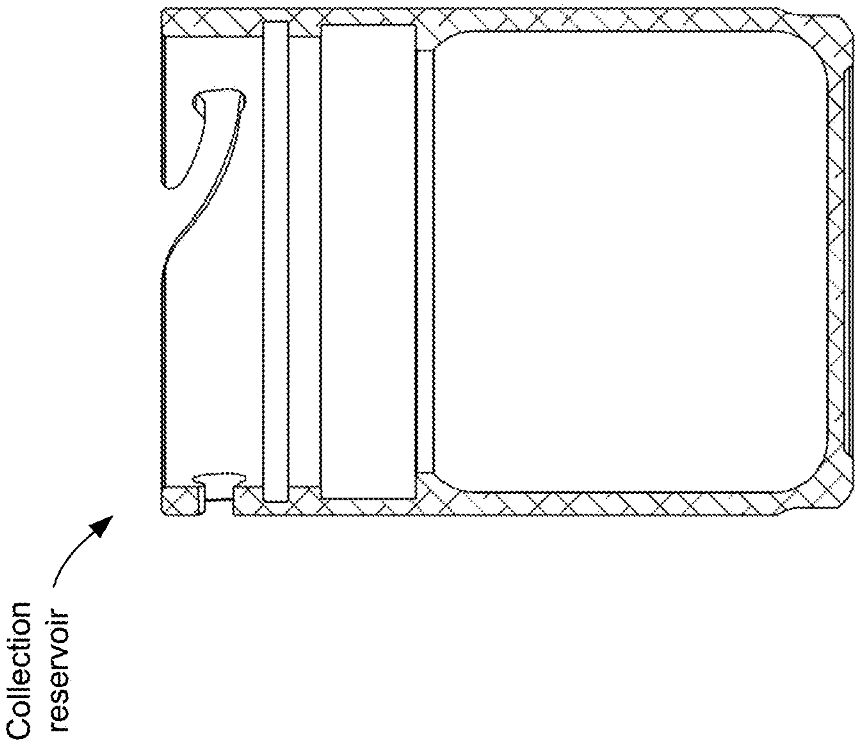
FIG. 9E is a cross-sectional view of the collection reservoir taken along line E-E of FIG. 9C.
Figure 9D:
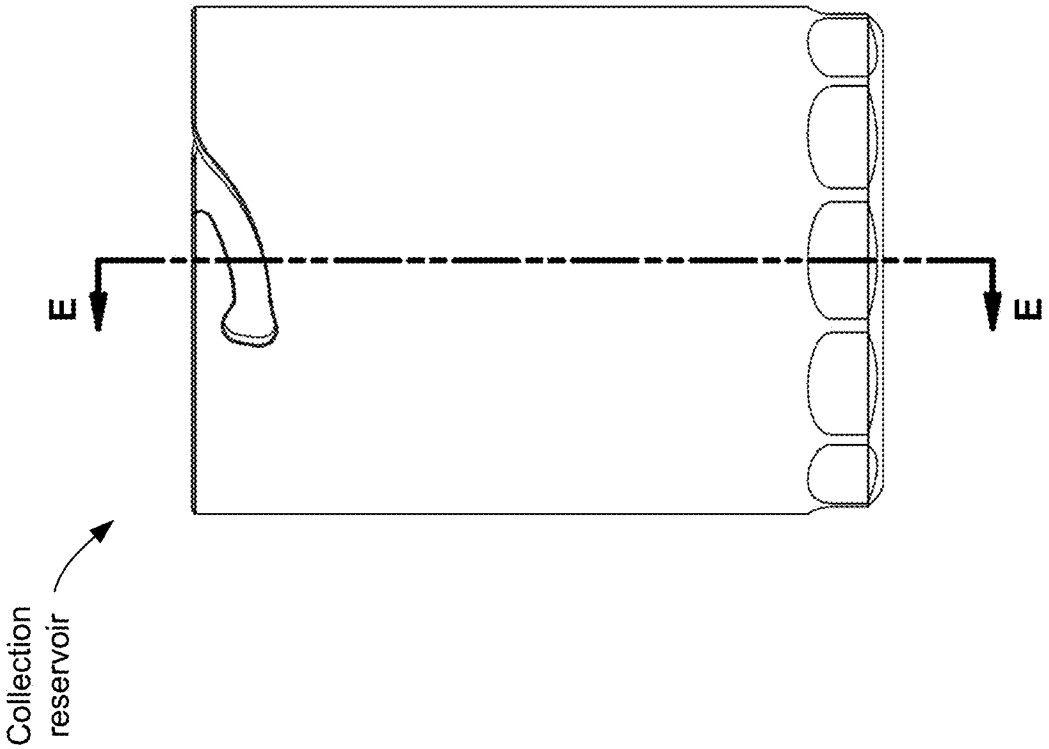
FIG. 9D is a side view of the collection reservoir.

FIGS. 9A through 9E are various views of one embodiment of a collection reservoir compatible with the device of the present disclosure. FIGS. 9A and 9B are perspective views of the collection reservoir. FIG. 9C is a perspective view, partly in section, of the collection reservoir. FIG. 9D is a side view of the collection reservoir. FIG. 9E is a cross-sectional view of the collection reservoir taken along line E-E of FIG. 9C.

As shown, the collection reservoir is generally in the form of a can, which includes an internal reservoir for collecting and holding contaminants removed from the air via the various separator components within the housing. As previously described, the collection reservoir and housing can be releasably coupled to one another via a bayonet mount-style connection. In particular, the collection reservoir includes multiple slots defined along perimeter of an opening thereof that are shaped and/or sized to receive a corresponding pin provided on the housing upon mounting and subsequent rotation of the collection reservoir relative to the housing. For example, the slots may have a hook latch design. The device further includes a spring member (i.e., a wave spring or the like) that can be held within an internal slot (shown in FIGS. 9C and 9D) that provides an opposing force to effectively lock a given pin of the housing within a corresponding slot (i.e., a hook latch portion) of the collection reservoir. In particular, referring back to FIG. 5A, a bottom edge of the housing contacts the wave spring when the housing and collection reservoir are coupled to one another. The wave spring is effectively providing an opposing force against the bottom edge of the housing, thereby pushing the collection reservoir and housing away from one another, which effectively maintains the hook latch pins of the housing within the hook latch pin slots of the collection reservoir. The collection reservoir further includes a gland for receiving and retaining an O-ring, which is used to effectively seal the housing to the collection reservoir when coupled to one another and prevent air and/or fluid from leaking. The collection reservoir may further include a grip feature provided at the base of the reservoir to improve a user's grip with the collection reservoir when securing the collection reservoir to, or removing the collection reservoir from, the housing.

Figure 10A:
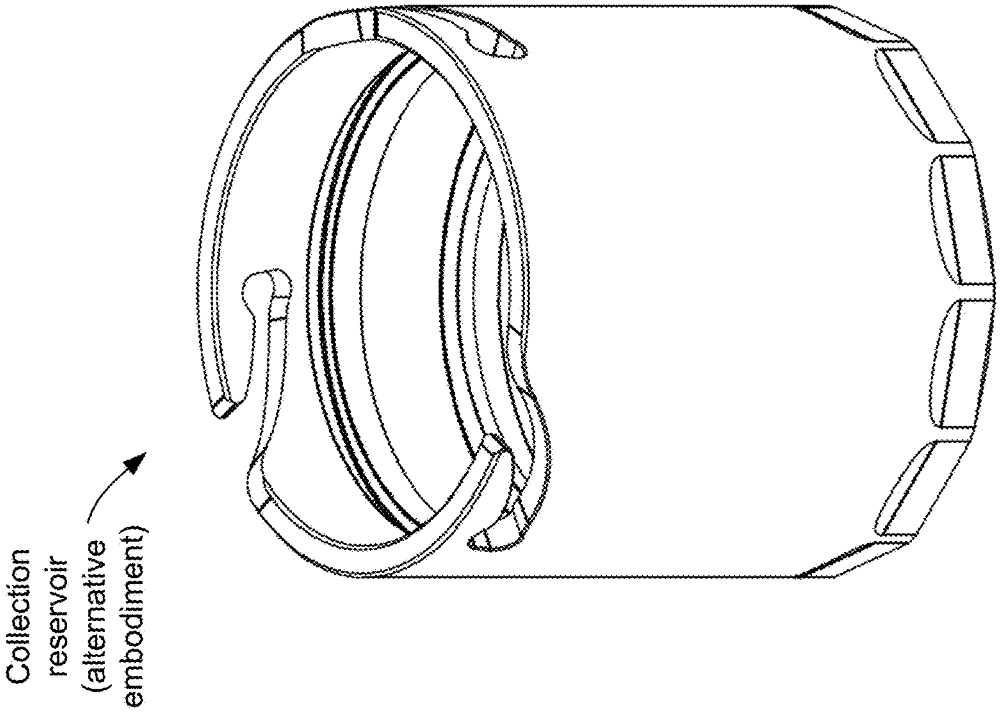
FIGS. 10A and 10B are perspective views of another embodiment of a collection reservoir consistent with the present disclosure.
Figure 10B:
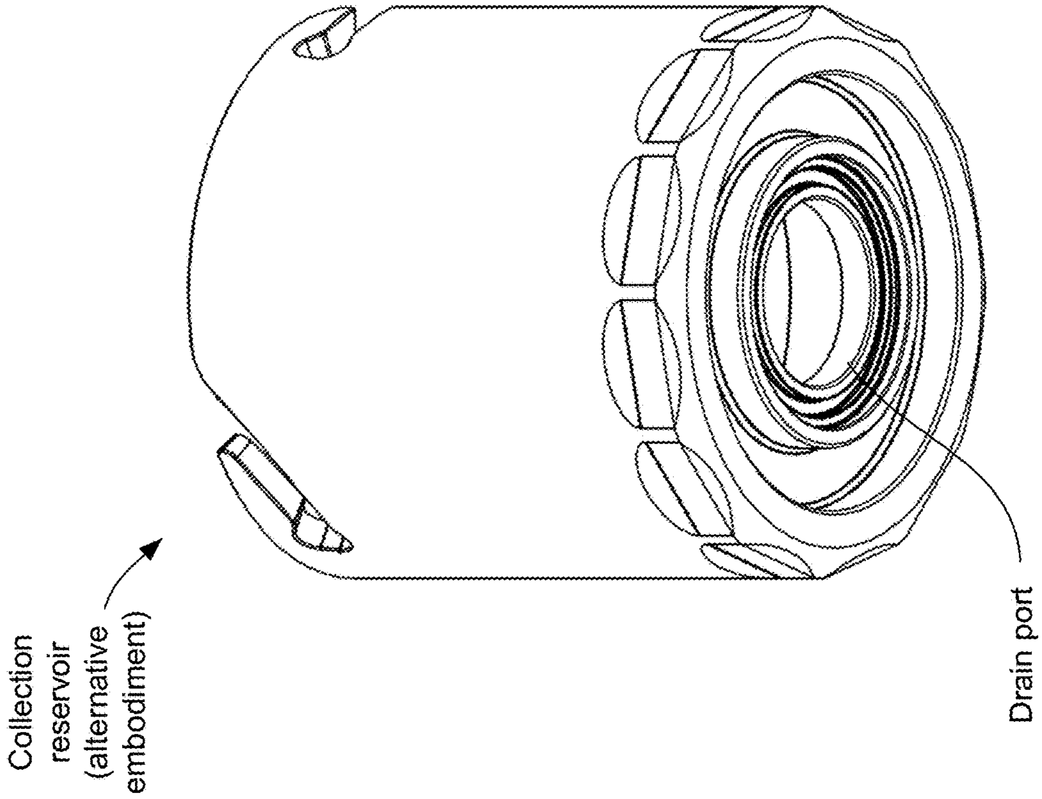
Figure 10C:
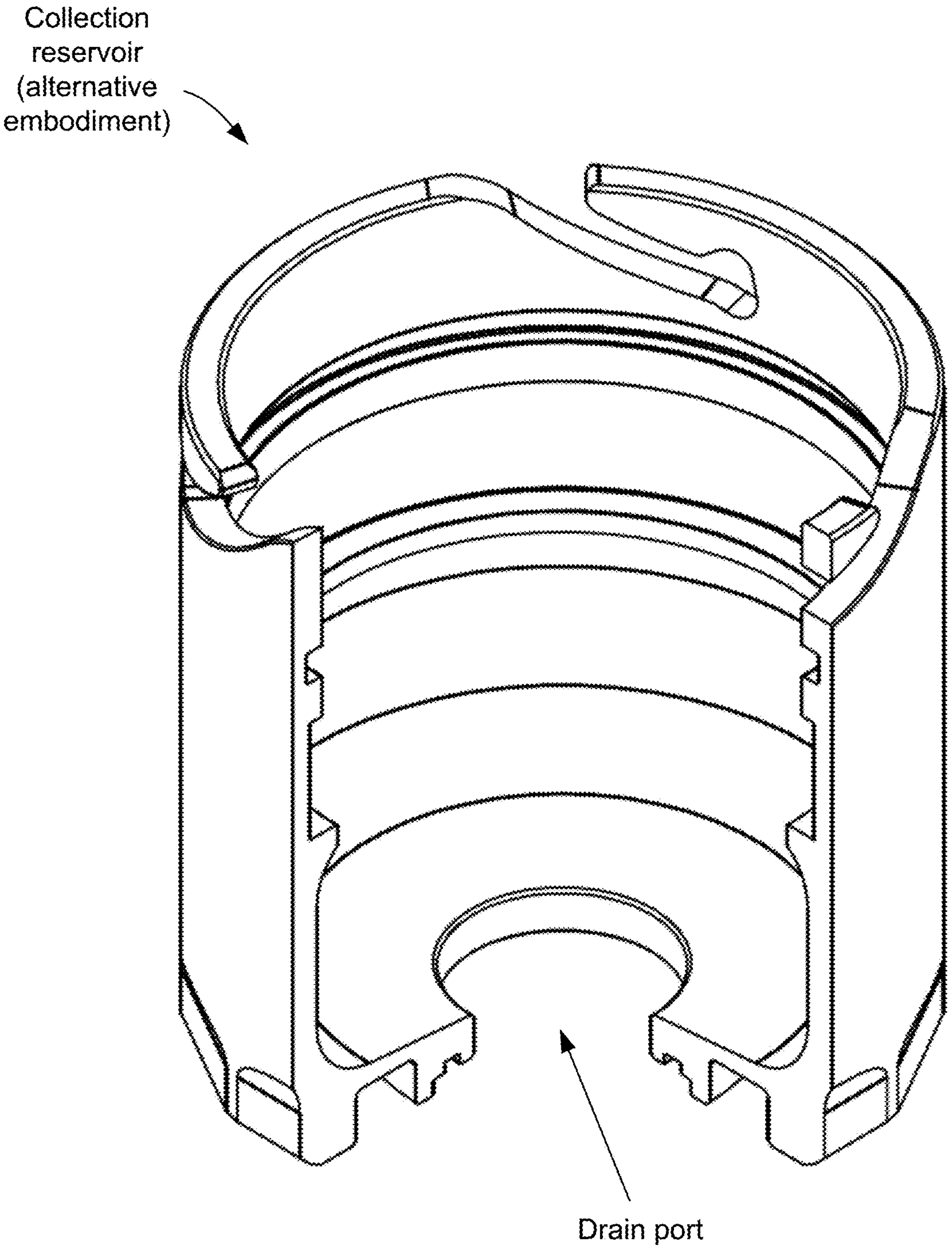
FIG. 10C is a perspective view, partly in section, of the collection reservoir of FIGS. 10A and 10B.

FIGS. 10A and 10B are perspective views of another embodiment of a collection reservoir consistent with the present disclosure. FIG. 10C is a perspective view, partly in section, of the collection reservoir of FIGS. 10A and 10B. In the illustrated embodiment, the collection reservoir is smaller (i.e., shorter) than the collection reservoir of FIGS. 9A through 9E. Furthermore, the collection reservoir of FIGS. 10A through 10C includes a drain port provided at a base of the reservoir (drain plug not shown).

Figure 11B:
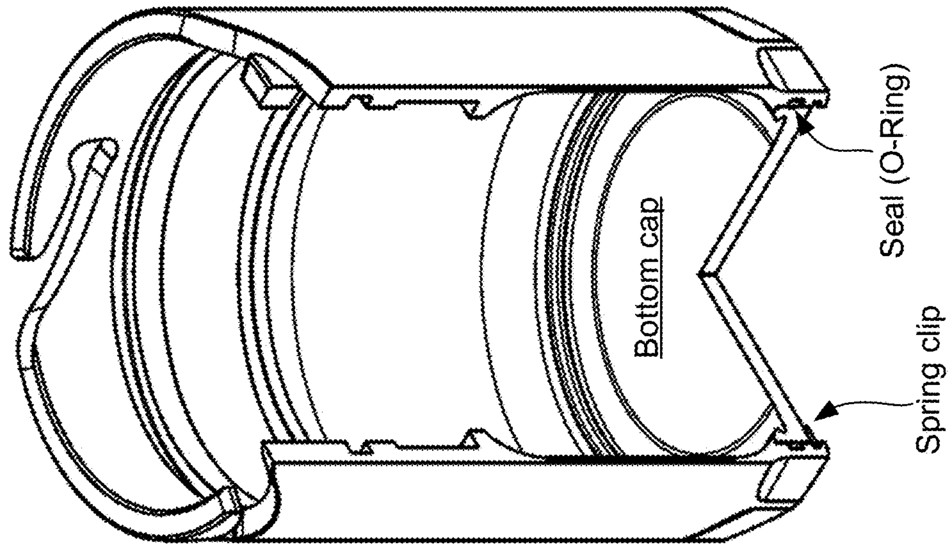
FIGS. 11A and 11B are perspective views, including partly in section (FIG. 11B), of another embodiment of a collection reservoir consistent with the present disclosure, illustrating a replaceable bottom cap portion.
Figure 11A:
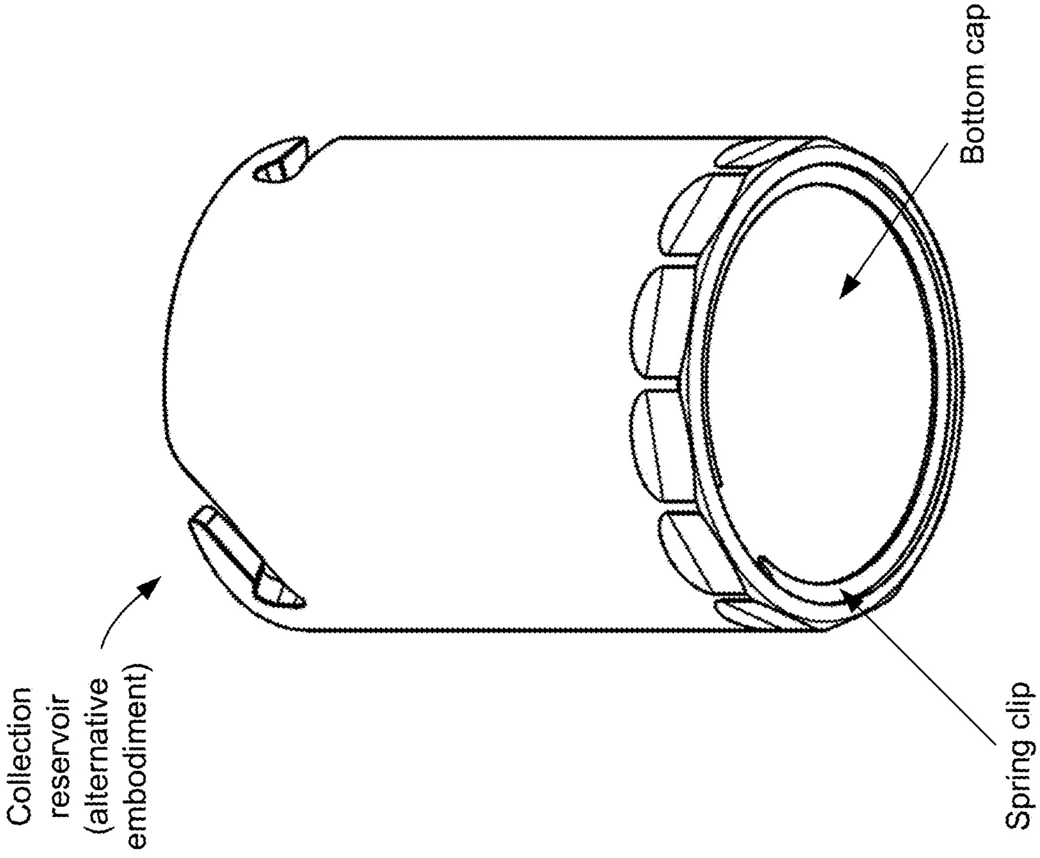
Figure 11C:
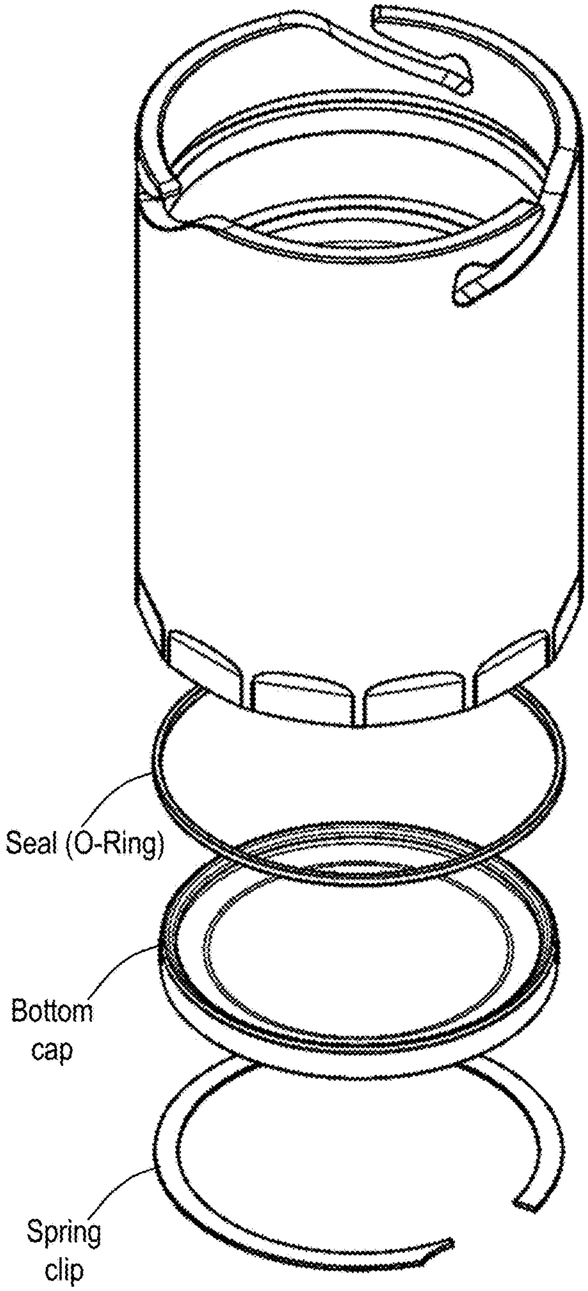
FIGS. 11C and 11D are perspective, exploded views of the collection reservoir of FIGS. 11A and 11B, showing the multiple components of the replaceable bottom cap portion.
Figure 11D:
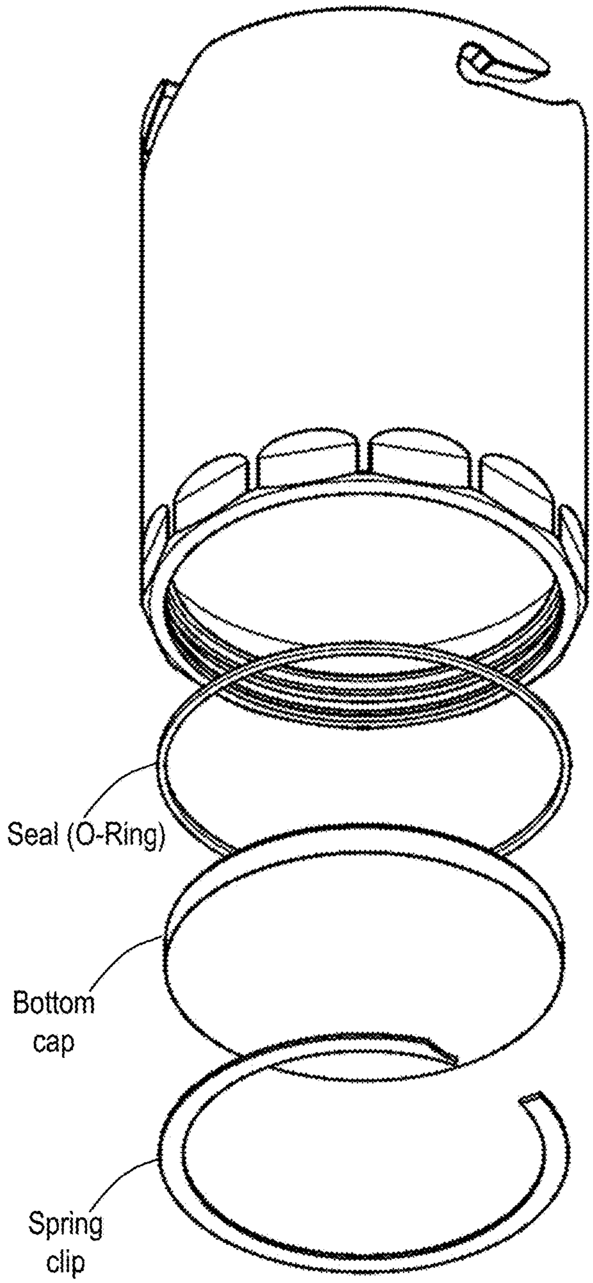

FIGS. 11A and 11B are perspective views, including partly in section (FIG. 11B), of another embodiment of a collection reservoir consistent with the present disclosure, illustrating a replaceable bottom cap portion. FIGS. 11C and 11D are perspective, exploded views of the collection reservoir of FIGS. 11A and 11B, showing the multiple components of the replaceable bottom cap portion. In the illustrated embodiment, the bottom cap portion may generally be removable/replaceable, in contrast to being formed integrally as part of the reservoir (i.e., formed as a monolithic structure). The bottom cap assembly may generally include a seal (i.e., O-ring or the like) to provide an airtight and/or watertight seal when the bottom cap is attached to the bottom of the reservoir, as well as a spring clip or other means of locking the bottom cap in place.

Figure 12A:
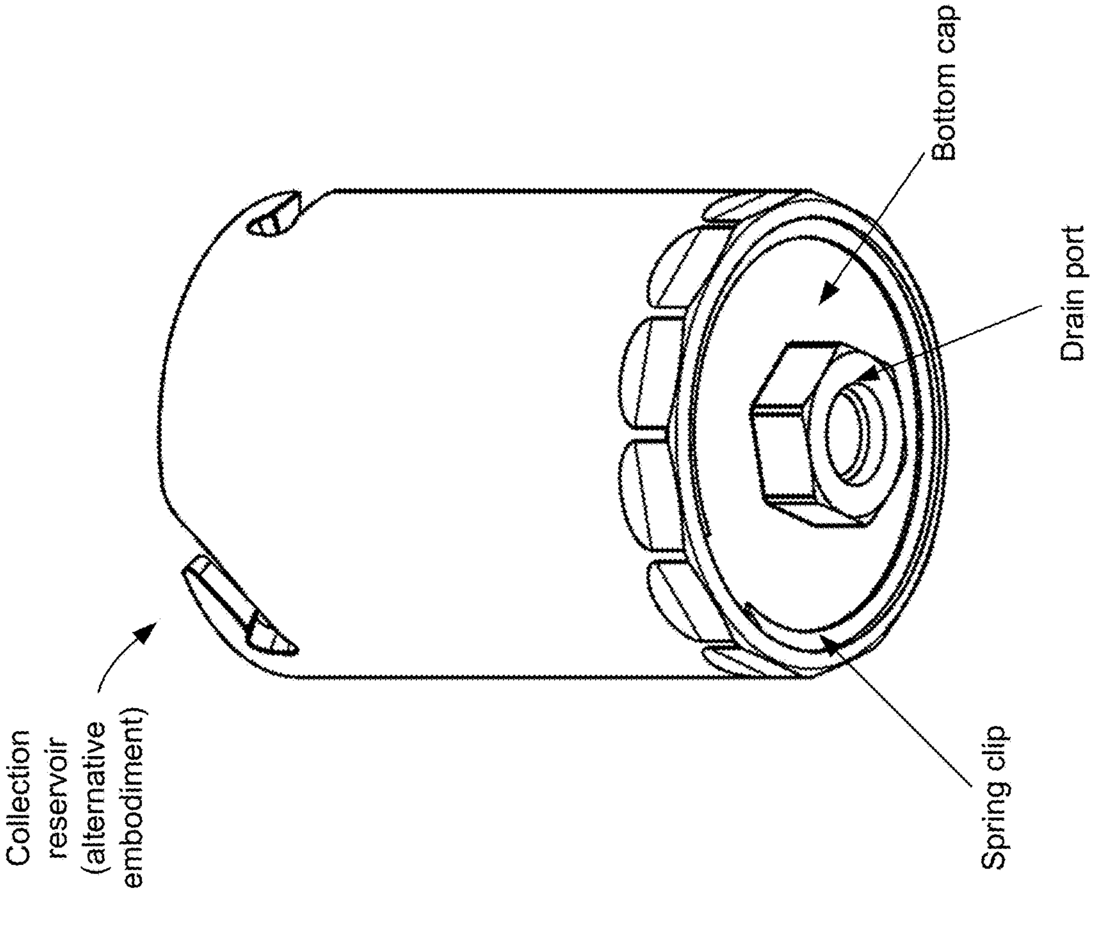
FIGS. 12A and 12B are perspective views, including partly in section (FIG. 12B), of another embodiment of a collection reservoir consistent with the present disclosure, illustrating a replaceable bottom cap portion having a drain port.
Figure 12B:
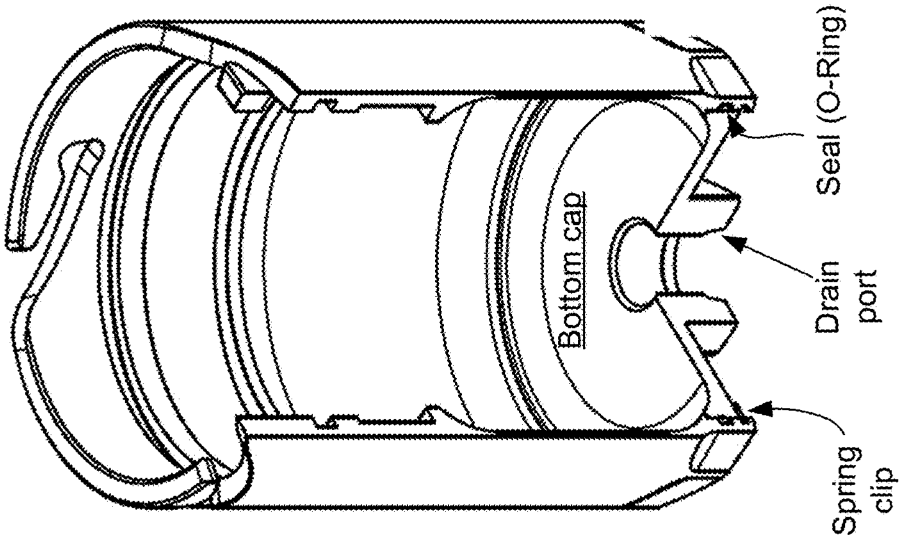
Figure 12C:
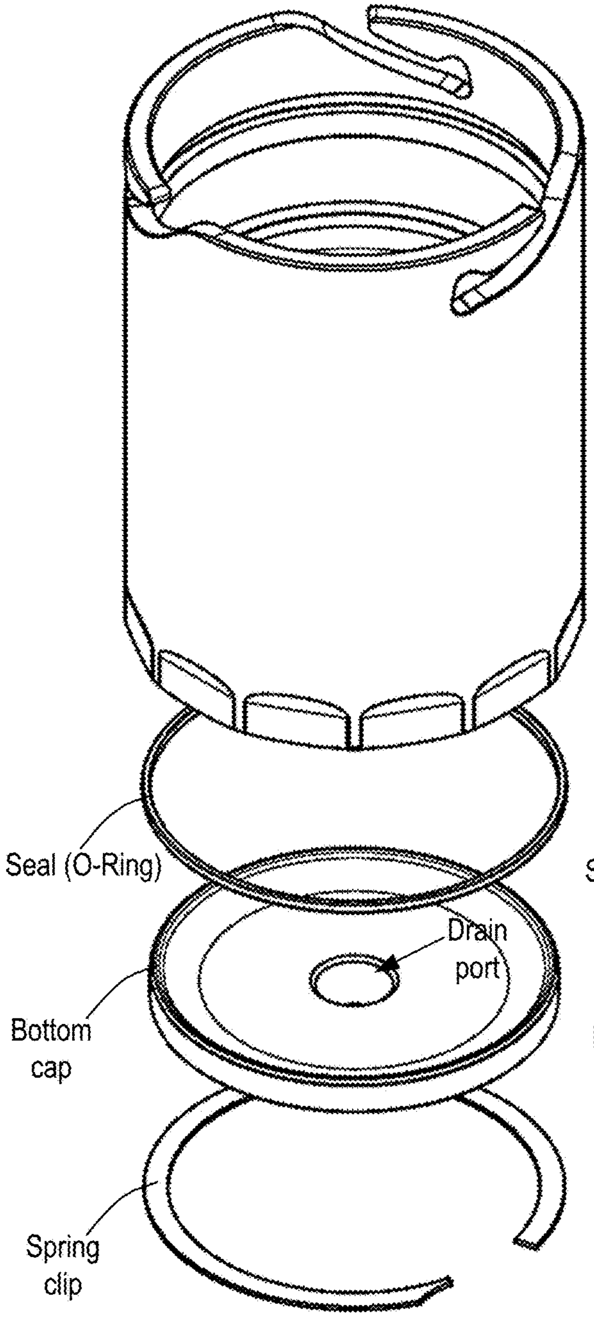
FIGS. 12C and 12D are perspective, exploded views of the collection reservoir of FIGS. 12A and 12B, showing the multiple components of the replaceable bottom cap portion having a drain port.
Figure 12D:
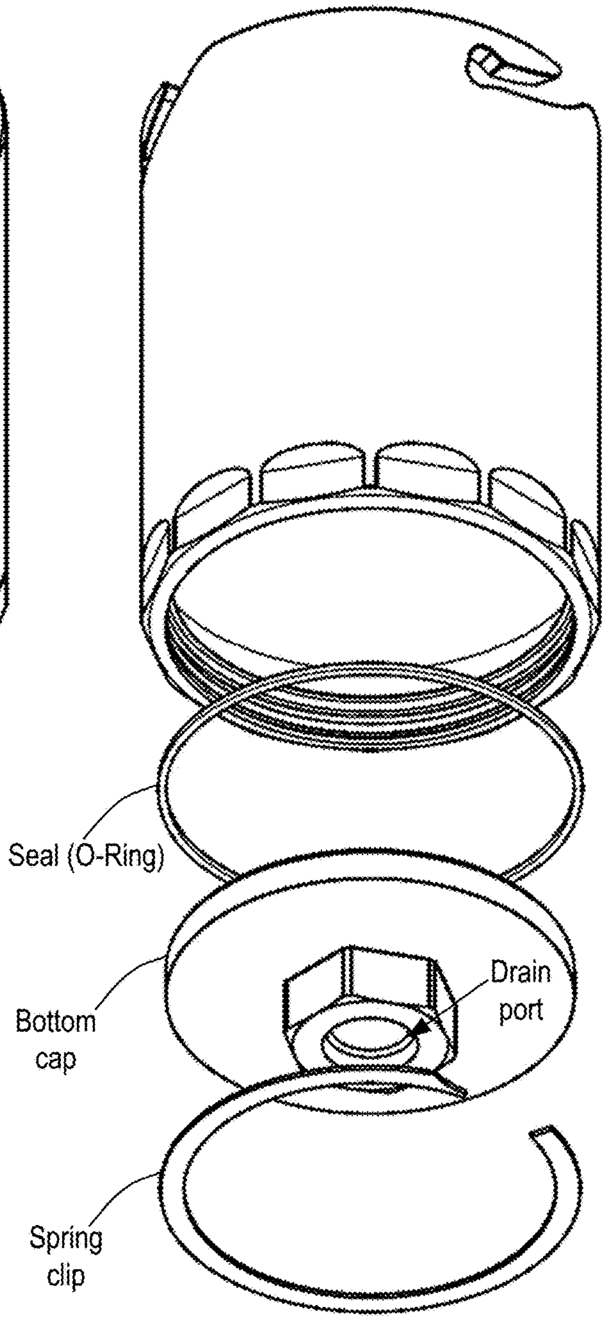

FIGS. 12A and 12B are perspective views, including partly in section (FIG. 12B), of another embodiment of a collection reservoir consistent with the present disclosure, illustrating a replaceable bottom cap portion having a drain port (drain plug not shown). FIGS. 12C and 12D are perspective, exploded views of the collection reservoir of FIGS. 12A and 12B, showing the multiple components of the replaceable bottom cap portion having a drain port. The replaceable bottom cap portion shown in FIGS. 12A-12D is similarly arranged as the replaceable bottom cap portion shown in FIGS. 11A-11D, and includes similar components (i.e., seal, spring clip, etc.).

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

Equivalents

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. An air-fluid separator comprising:

a housing comprising separator components cooperatively arranged to define a pathway through which untreated and potentially contaminated air flows and undergoes treatment in which contaminants are removed therefrom, the housing comprising:

an inlet port for receiving untreated and potentially contaminated air and directing the air to flow into a separation chamber;

a filter assembly positioned adjacent to the separation chamber;

a drain funnel positioned adjacent to the filter assembly;

a clean air collector tube configured to allow air to pass therethrough, wherein the clean air collector tube comprises a bell-mouth shaped first end adjacent to the drain funnel and second opposing end adjacent to the outlet port; and an outlet port coupled to the clean air collector tube and configured to exhaust treated air; and a collection reservoir coupled to the housing and configured to receive and retain contaminants removed from the air.

2. The air-fluid separator of claim 1, wherein:

the filter assembly is positioned below the separation chamber and above the drain funnel;

the drain funnel is positioned below the filter assembly and suspended above and spaced apart from the collection reservoir; and the clean air collector tube is suspended above and spaced apart from the drain funnel and comprises a portion that extends through the filter assembly.

3. The air-fluid separator of claim 2, wherein the filter assembly is configured to receive deposited contaminants from the separation chamber while allowing air to pass therethrough towards the drain funnel.

4. The air-fluid separator of claim 3, wherein the filter assembly is configured to coalesce said deposited contaminants received from the separation chamber into larger deposits.

5. The air-fluid separator of claim 4, wherein the filter assembly comprises a plurality of vertically arranged filter layers, each filter layer comprising a different associated porosity.

6. The air-fluid separator of claim 5, wherein a top-most layer of the plurality of filter layers comprises finer porosity and a bottom-most layer of the plurality of filter layers comprises a coarser porosity.

7. The air-fluid separator of claim 6, wherein the plurality of filter layers are configured to assist in coalescing deposited contaminants received from the separation chamber into gradually larger deposits as said deposited contaminants pass through the plurality of filter layers.

8. The air-fluid separator of claim 2, wherein the filter assembly has a cylindrical shape and surrounds a portion of the clean air collector tube.

9. The air-fluid separator of claim 8, wherein the filter assembly comprises a central bore through which a body of the clean air collector tube passes therethrough and is centrally positioned relative to the filter assembly.

10. The air-fluid separator of claim 2, wherein the drain funnel comprises a plurality of spiral-shaped grooves formed along a collection surface thereof, said plurality of grooves being configured to collect contaminant deposits received from said filter assembly and direct said collected contaminant deposits towards a drain hole of the funnel and subsequently into a collection reservoir coupled to the housing.

11. The air-fluid separator of claim 10, wherein said plurality of grooves of the drain funnel are arranged to cause air to rotationally flow and thereby induce separation of any residual fluid content from air and subsequent deposition of said separated residual fluid content along an inner surface of the housing surrounding the drain funnel.

12. The air-fluid separator of claim 11, wherein said plurality of grooves of the drain funnel are arranged to cause air to rotationally flow in the same direction as rotational flow of air within the separation chamber.

13. The air-fluid separator of claim 1, wherein the drain funnel is shaped and/or sized to substantially prevent fluid backsplash from the collection reservoir and into the pathway through which air flows.

14. The air-fluid separator of claim 1, wherein said bell-mouth shaped first end of the clean air collector tube has a larger diameter than the second opposing end of the clean air collector tube.

15. The air-fluid separator of claim 14, wherein the shape and/or size of the bell-mouth shaped first end is configured to reduce the speed of air flowing into and through the clean air collector tube to thereby prevent migration of any contaminants deposited along a wall or lip of the bell-mouth shaped first end toward the second opposing end of the clean air collector tube.

16. The air-fluid separator of claim 14, wherein a lip of the bell-mouth shaped first end is shaped so as to cause contaminants deposited along a wall of the bell-mouth shaped first end to coalesce into larger deposits along the lip.

17. The air-fluid separator of claim 1, wherein the inlet port has a tangential orientation relative to an inner surface of the housing to thereby cause incoming untreated and potentially contaminated air to rotationally flow within the separation chamber of the housing and induce separation of contaminants from air and subsequent deposition of said separated contaminants along an outer perimeter of the separation chamber.

18. The air-fluid separator of claim 1, wherein the collection reservoir and housing are releasably couplable to one another via a bayonet mount-style connection.

19. The air-fluid separator of claim 18, wherein the collection reservoir comprises at least one slot defined along perimeter thereof that is shaped and/or sized to receive a corresponding pin provided on the housing upon mounting and subsequent rotation of the collection reservoir relative to the housing.

20. The air-fluid separator of claim 19, further comprising a locking clip configured to lock the collection reservoir into engagement with the housing.

21. The air-fluid separator of claim 1, wherein the contaminants include any amount of water, oil, carbon particles, and/or fuel, or a combination thereof.

22. An air-fluid separator comprising:

a housing comprising separator components cooperatively arranged to define a pathway through which untreated and potentially contaminated air flows and undergoes treatment in which contaminants are removed therefrom, the housing comprising:

an inlet port for receiving untreated and potentially contaminated air and directing the air to flow into a separation chamber;

a filter assembly positioned adjacent to the separation chamber and configured to receive deposited contaminants from the separation chamber and further configured to coalesce said deposited contaminants into larger deposits while allowing air to pass therethrough;

a drain funnel positioned adjacent to the filter assembly, the funnel comprising a plurality of spiral-shaped grooves formed along a collection surface thereof, said plurality of grooves being configured to collect contaminant deposits received from said filter assembly and direct said collected contaminant deposits towards a drain hole of the funnel and subsequently into a collection reservoir coupled to the housing;

a clean air collector tube suspended vertically above and spaced apart from the drain funnel and configured to allow air to pass therethrough; and an outlet port coupled to the clean air collector tube and configured to exhaust treated air; and a collection reservoir coupled to the housing and configured to receive and retain contaminants removed from the air.

23. The air-fluid separator of claim 22, wherein said plurality of grooves of the drain funnel are arranged to cause air to rotationally flow and thereby induce separation of any residual fluid content from air and subsequent deposition of said separated residual fluid content along an inner surface of the housing surrounding the drain funnel.

24. The air-fluid separator of claim 23, wherein the plurality of grooves are arranged to cause air to rotationally flow in the same direction as rotational flow of air within the separation chamber.

25. The air-fluid separator of claim 22, wherein the drain funnel is vertically suspended above and spaced apart from the collection reservoir, the drain funnel is shaped and/or sized to substantially prevent fluid backsplash from the collection reservoir and into the pathway through which air flows.

26. An air-fluid separator comprising:

a housing comprising separator components cooperatively arranged to define a pathway through which untreated and potentially contaminated air flows and undergoes treatment in which contaminants are removed therefrom, the housing comprising:

an inlet port for receiving untreated and potentially contaminated air and directing the air to flow into a separation chamber;

a filter assembly positioned adjacent to the separation chamber and configured to receive deposited contaminants from the separation chamber and further configured to coalesce said deposited contaminants into larger deposits while allowing air to pass therethrough;

a drain funnel positioned adjacent to the filter assembly and configured to collect contaminant deposits received from said filter assembly and direct said collected contaminant deposits towards a drain hole of the funnel and subsequently into a collection reservoir coupled to the housing;

a clean air collector tube suspended vertically above and spaced apart from the drain funnel and configured to allow air to flow therethrough, the clean air collector comprising a bell-mouth shaped first end adjacent to the drain funnel and second opposing end; and an outlet port coupled to the clean air collector tube and configured to exhaust treated air; and a collection reservoir coupled to the housing and configured to receive and retain contaminants removed from the air.

27. The air-fluid separator of claim 26, wherein said bell-mouth shaped first end of the clean air collector tube has a larger diameter than the second opposing end of the clean air collector tube.

28. The air-fluid separator of claim 27, wherein said shape and/or size of the bell-mouth shaped first end is configured to reduce the speed of air flowing into and through the clean air collector tube to thereby prevent migration of any contaminants deposited along a wall or lip of the bell-mouth shaped first end toward the second opposing end of the clean air collector tube.

29. The air-fluid separator of claim 27, wherein a lip of the bell-mouth shaped first end is shaped so as to cause contaminants deposited along a wall of the bell-mouth shaped first end to coalesce into larger deposits along the lip.

30. An air-fluid separator comprising:

a housing comprising separator components cooperatively arranged to define a pathway through which untreated and potentially contaminated air flows and undergoes treatment in which contaminants are removed therefrom, the housing comprising:

an inlet port for receiving untreated and potentially contaminated air and directing the air to flow into a separation chamber;

a filter assembly positioned adjacent to the separation chamber and configured to receive deposited contaminants from the separation chamber and further configured to coalesce said deposited contaminants into larger deposits while allowing air to pass therethrough;

a drain funnel positioned adjacent to the filter assembly and configured to collect contaminant deposits received from said filter assembly and direct said collected contaminant deposits towards a drain hole of the funnel and subsequently into a collection reservoir coupled to the housing;

a clean air collector tube suspended vertically above and spaced apart from the drain funnel and configured to allow air to flow therethrough, the clean air collector comprising a bell-mouth shaped first end adjacent to the drain funnel and second opposing end; and an outlet port coupled to the clean air collector tube and configured to exhaust treated air; and a collection reservoir coupled to the housing and configured to receive and retain contaminants removed from the air.

31. The air-fluid separator of claim 30, wherein said plurality of grooves of the drain funnel are arranged to cause air to rotationally flow and thereby induce separation of any residual fluid content from air and subsequent deposition of said separated residual fluid content along an inner surface of the housing surrounding the drain funnel.

32. The air-fluid separator of claim 31, wherein the plurality of grooves are arranged to cause air to rotationally flow in the same direction as rotational flow of air within the separation chamber.

33. The air-fluid separator of claim 30, wherein the drain funnel is vertically suspended above and spaced apart from the collection reservoir, the drain funnel is shaped and/or sized to substantially prevent fluid backsplash from the collection reservoir and into the pathway through which air flows.

34. The air-fluid separator of claim 30, wherein said bell-mouth shaped first end of the clean air collector tube has a larger diameter than the second opposing end of the clean air collector tube.

35. The air-fluid separator of claim 34, wherein said shape and/or size of the bell-mouth shaped first end is configured to reduce the speed of air flowing into and through the clean air collector tube to thereby prevent migration of any contaminants deposited along a wall or lip of the bell-mouth shaped first end toward the second opposing end of the clean air collector tube.

36. The air-fluid separator of claim 34, wherein a lip of the bell-mouth shaped first end is shaped so as to cause contaminants deposited along a wall of the bell-mouth shaped first end to coalesce into larger deposits along the lip.

* * * * *